United States Patent
Iwazaki et al.

(10) Patent No.: US 11,285,809 B2
(45) Date of Patent: Mar. 29, 2022

(54) TRAVEL CONTROL APPARATUS FOR FOUR-WHEEL DRIVE VEHICLE

(71) Applicant: Toyota Jidosha Kabushiki Kaisha, Toyota (JP)

(72) Inventors: Noritsugu Iwazaki, Shizuoka-ken (JP); Yusuke Suetake, Machida (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 369 days.

(21) Appl. No.: 16/592,986

(22) Filed: Oct. 4, 2019

(65) Prior Publication Data

US 2020/0108716 A1    Apr. 9, 2020

(30) Foreign Application Priority Data

Oct. 9, 2018  (JP) .............................. JP2018-190632

(51) Int. Cl.
*B60K 23/04*  (2006.01)
*B60K 23/08*  (2006.01)
(Continued)

(52) U.S. Cl.
CPC ........ *B60K 23/0808* (2013.01); *B60K 17/346* (2013.01); *F16H 48/05* (2013.01); *B60K 2023/043* (2013.01); *B60K 2023/0825* (2013.01)

(58) Field of Classification Search
CPC .............. B60K 23/0808; B60K 17/346; B60K 2023/043; B60K 2023/0825; B60K 23/04; B60K 2023/0833; B60K 23/08; B60K 17/35; B60K 2023/0858; F16H 48/05; F16H 48/19; B60W 2520/125; B60Y 2400/424

See application file for complete search history.

(56) References Cited

U.S. PATENT DOCUMENTS 5,479,348 A * 12/1995 Sasaki .................... B60K 23/04
                                                    701/88
2006/0254845 A1* 11/2006 Baasch ................. F16D 48/064
                                                    180/233

(Continued)

FOREIGN PATENT DOCUMENTS

EP         3628523 A1 *  4/2020 ............. B60K 17/35
JP      2007-045194 A     2/2007

*Primary Examiner* — Justin Holmes
(74) *Attorney, Agent, or Firm* — Dinsmore & Shohl LLP

(57) ABSTRACT

Disclosed is a travel control apparatus for a four-wheel drive vehicle in which the states of engagements between a drive output part for secondary drive wheels and left and right secondary drive wheel axles are each changed to a torque transmission state or a torque transmission interruption state. The ratio of rotational speed of the drive output part to the average of rotational speeds of primary drive wheels is greater than 1. When the engagement states corresponding to the secondary drive wheels on the outer and inner sides of a turning locus have been set to the torque transmission state and the torque transmission interruption state, respectively, the engagement state having been set to the torque transmission state is changed to the torque transmission interruption state upon determination that an accelerator pedal is not operated and the magnitude of lateral acceleration is equal to or greater than a predetermined threshold.

8 Claims, 10 Drawing Sheets

(51) Int. Cl.
*F16H 48/05* (2012.01)
*B60K 17/346* (2006.01)

(56) References Cited

U.S. PATENT DOCUMENTS

| | | |
|---|---|---|
| 2007/0029127 A1 | 2/2007 | Mori et al. |
| 2019/0084416 A1* | 3/2019 | Watanabe .............. B60K 23/04 |
| 2020/0164868 A1* | 5/2020 | Suetake ................ B60W 10/02 |

* cited by examiner

TRAVEL CONTROL APPARATUS FOR FOUR-WHEEL DRIVE VEHICLE

CROSS-REFERENCE TO RELATED APPLICATION

This application claims priority to Japanese Application No. 2018-190632 filed on Oct. 9, 2018, the entire contents of which are incorporated by reference.

BACKGROUND

1. Technical Field

The present disclosure relates to a travel control apparatus applied to a four-wheel drive vehicle which includes a differential apparatus for transmitting driving force generated by a drive apparatus to left and right primary drive wheels, and a final gear apparatus for secondary drive wheels for transmitting the driving force to left and right secondary drive wheels.

2. Description of the Related Art

In a conventionally known four-wheel drive vehicle, a first coupling apparatus is disposed between a left secondary drive wheel axle and a drive output part of a final gear apparatus for secondary drive wheels, and a second coupling apparatus is disposed between a right secondary drive wheel axle and the drive output part. The secondary drive wheels are wheels to which driving force is transmitted variably in accordance with the engagement states of the first coupling apparatus and the second coupling apparatus. In contrast, the primary drive wheels are wheels to which driving force is transmitted at all times.

In one four-wheel drive vehicle (hereinafter also referred to as the "vehicle" for simplification) of such a type, front wheels are used as primary drive wheels, rear wheels are used as secondary drive wheels, and the gear ratio (hereinafter also referred to as the "speed increasing ratio") of a power transmission mechanism is set such that the rotational speed of the drive output part of the final gear apparatus for rear wheels becomes higher than the average of the rotational speeds of left and front right wheel axles. Further, a travel control apparatus mounted on the vehicle (hereinafter referred to as the "conventional apparatus") performs coupling torque control, for example, when the vehicle turns. In the coupling torque control, the coupling torque of a coupling apparatus corresponding to a rear wheel on the outer side of a turning locus is increased, and the coupling torque of a coupling apparatus corresponding to a rear wheel on the inner side of the turning locus is set to zero. Namely, the conventional apparatus generates driving force only at the rear wheel on the outer side of the turning locus. In this manner, the conventional apparatus generates a yaw moment in a turning direction in the vehicle. As a result, the turning performance of the vehicle is enhanced (see, for example, Japanese Patent Application Laid-Open (kokai) No. 2007-45194 (FIG. 1)). Hereinafter, the above-mentioned control will also be referred to as "yaw moment control by driving force."

Incidentally, in the case where the vehicle is travelling in a state in which each of the coupling torques of the first coupling apparatus and the second coupling apparatus is set to a level determined such that the wheels do not slip, the rotational speed of the front left wheel and the rotational speed of the rear left wheel are approximately equal to each other. Similarly, the rotational speed of the front right wheel and the rotational speed of the rear right wheel are approximately equal to each other. Accordingly, the rotational speed of the drive output part of the final gear apparatus for rear wheels is higher than the average of the rotational speed of the left and front right wheel axles by an amount corresponding to the speed increasing ratio, and therefore, is higher than the rotational speeds of the rear wheels within a predetermined steering angle range.

Incidentally, when the accelerator pedal of the vehicle is operated, driving force is generated at each of the front wheels and the rear wheels. However, when the accelerator pedal is not operated (when accelerator opening is zero), the driving forces of the front wheels disappear, and instead, braking force attributable to engine braking is generated. However, at that time, torque is transmitted to the rear wheels from the drive output part rotating faster than the rear wheels through the first coupling apparatus and the second coupling apparatus. Accordingly, driving forces rather than braking forces are generated at the rear wheels.

Due to the driving forces generated at the rear wheels, at the front wheels, there are generated not only the braking forces attributable to engine braking, but also braking forces (negative longitudinal force) for cancelling the driving forces (positive longitudinal forces) generated by the rear wheels. As a result, the maximum lateral force that each front wheel can generate (hereinafter also referred to as "lateral force margin") decreases, which may create conditions under which the vehicle easily causes understeer behavior.

SUMMARY

The present disclosure has been made to solve the above-mentioned problem. Specifically, one object of the present disclosure is to provide an improved travel control apparatus for a four-wheel drive vehicle in which the above-mentioned speed increasing ratio is set to a predetermined ratio greater than 1. In the case where the vehicle is traveling while turning in a state in which one of first and second coupling apparatuses corresponding to a secondary drive wheel on the outer side of a turning locus is controlled to produce a larger coupling torque, the improved travel control apparatus prevents the lateral force margins of primary drive wheels from decreasing when the accelerator pedal of the vehicle is not operated. Thus, the improved travel control apparatus can simultaneously achieve enhancement of turning performance through the yaw moment control by driving force and reduction of the frequency at which understeer behavior occurs.

A travel control apparatus for a four-wheel drive vehicle according to the present disclosure (hereinafter also referred to as "present disclosure apparatus") is applied to a four-wheel drive vehicle (10).

The four-wheel drive vehicle includes a drive apparatus (20), a differential apparatus (31), a transfer gear apparatus (33), a final gear apparatus (35), a first coupling apparatus (361), and a second coupling apparatus (362).

The drive apparatus generates driving force. The differential apparatus transmits the driving force to a left primary drive wheel axle (32L) connected to a left primary drive wheel (WFL) and a right primary drive wheel axle (32R) connected to a right primary drive wheel (WFR) while allowing a differential between the left primary drive wheel axle and the right primary drive wheel axle. The transfer gear apparatus transmits the driving force to a secondary drive wheel side. The final gear apparatus transmits the driving force from the transfer gear apparatus to a left secondary drive wheel axle (38L) connected to a left secondary drive wheel (WRL) and a right secondary drive wheel axle (38R) connected to a right secondary drive wheel (WRR).

The first coupling apparatus is interposed between a drive output part (353) of the final gear apparatus and the left secondary drive wheel axle and is configured to be able to change a first engagement state which is the state of engagement between the drive output part and the left secondary drive wheel axle between a torque transmission state in which torque is transmitted between the drive output part and the left secondary drive wheel axle and a torque transmission interruption state in which no torque is transmitted between the drive output part and the left secondary drive wheel axle. The second coupling apparatus is interposed between the drive output part and the right secondary drive wheel axle and is configured to be able to change a second engagement state which is the state of engagement between the drive output part and the right secondary drive wheel axle between a torque transmission state in which torque is transmitted between the drive output part and the right secondary drive wheel axle and a torque transmission interruption state in which no torque is transmitted between the drive output part and the right secondary drive wheel axle.

In the four-wheel drive vehicle, a ratio (speed increasing ratio RZ) of "rotational speed of the drive output part" to the "average of rotational speed of the left primary drive wheel axle and rotational speed of the right primary drive wheel axle" is set to a predetermined ratio greater than 1.

Each of the first coupling apparatus and the second coupling apparatus may be a multi-disc clutch, an electromagnetic clutch, or a clutch in which a multi-disc clutch and an electromagnetic clutch are combined. For example, when the "yaw moment control by driving force" is performed while the vehicle is turning, the engagement state of the coupling apparatus corresponding to the secondary drive wheel on the outer side of a turning locus is set to the torque transmission state, and the engagement state of the coupling apparatus corresponding to the secondary drive wheel on the inner side of the turning locus is set to the torque transmission interruption state. Since the speed increasing ratio is larger than 1, the secondary drive wheel on the outer side of the turning locus can generate a driving force while rotating at a rotational speed higher than the "average of the rotational speed of the left primary drive wheel axle and the rotational speed of the right primary drive wheel axle," in the same manner as the primary drive wheel on the outer side of the turning locus. Therefore, according to the above-mentioned configuration, the driving force generated at the secondary drive wheel on the outer side of the turning locus more effectively contributes to the turning of the vehicle.

The apparatus of the present disclosure comprises a lateral acceleration sensor (86) for detecting lateral acceleration of the four-wheel drive vehicle, and a controller (60) which can independently set each of the first engagement state and the second engagement state to the torque transmission state or the torque transmission interruption state.

According to the above-mentioned configuration, the controller can perform the "yaw moment control by driving force" by using the first coupling apparatus and the second coupling apparatus.

Incidentally, as described above, in the case where the accelerator pedal is not operated in a state in which one of the first engagement state and the second engagement state has been set to the torque transmission state, driving force may be generated at the secondary drive wheel which is connected to the drive output part through the coupling apparatus set in the torque transmission state. At that time, no driving force is generated at each of the primary drive wheels, and braking force attributable to engine braking is generated. In other words, even when braking force (negative longitudinal force) is generated at each of the primary drive wheels, in some cases, driving force (positive longitudinal force) may be generated at each of the secondary drive wheels. As a result, braking force for cancelling the driving forces generated at the secondary drive wheels is generated at each of the primary drive wheels, so that the lateral force margins of the primary drive wheels may decrease.

In order to overcome the above-mentioned drawback, in the case where one of the first engagement state and the second engagement state which corresponds to a secondary drive wheel on the outer side of a turning locus has been set to the torque transmission state and the other of the first engagement state and the second engagement state which corresponds to a secondary drive wheel on the inner side of the turning locus has been set to the torque transmission interruption state, the controller determines, when an accelerator pedal (81a) is not operated (Step 820: No), whether the magnitude (|Gy|) of the detected lateral acceleration is equal to or greater than a predetermined lateral acceleration threshold (Gyth) (Step 860).

Further, the controller changes the engagement state having been set to the torque transmission state to the torque transmission interruption state (Step 840) upon determination that the magnitude of the detected lateral acceleration is equal to or greater than the predetermined lateral acceleration threshold (Step 860: Yes).

As described above, when the magnitude of the lateral acceleration of the vehicle is equal to or greater than the predetermined lateral acceleration threshold, the lateral force generated at each wheel is relatively large, and the required lateral force margin is large. In view of this, the apparatus of the present disclosure changes the engagement state of the coupling apparatus having been set to the torque transmission state (i.e., the coupling apparatus for the secondary drive wheel on the outer side of the turning locus) is changed to the torque transmission interruption state, and the four-wheel drive vehicle is driven by the primary drive wheels only. As a result, the apparatus of the present disclosure can prevent the lateral force margins of the primary drive wheels from decreasing when the accelerator pedal is not operated (when the accelerator opening is zero). As a result, the apparatus of the present disclosure can simultaneously achieve the enhancement of turning performance through the "yaw moment control by driving force" and the reduction of the frequency of occurrence of understeer behavior.

In one aspect of the present disclosure apparatus, the controller is configured to determine, when the accelerator pedal is not operated, whether a brake pedal (41) is operated (Step 830), and change the engagement state having been set to the torque transmission state to the torque transmission interruption state upon determination that the brake pedal is operated (Step 830: Yes), irrespective of the magnitude of the lateral acceleration.

According to the aspect, when the apparatus of the present disclosure determines that the brake pedal is operated, the engagement state of the coupling apparatus having been set to the torque transmission state is changed to the torque transmission interruption state. As a result, the apparatus of the present disclosure can reduce the frequency of occurrence of understeer behavior due to the braking forces generated at the primary drive wheels when the brake pedal is operated.

In one aspect of the present disclosure apparatus, the four-wheel drive vehicle further includes a yaw rate sensor (85) for detecting yaw rate of the four-wheel drive vehicle. When the accelerator pedal is not operated, the controller determines whether the detected yaw rate (Yr) has deviated from a normative yaw rate (Ym) determined in accordance with a travel state of the four-wheel drive vehicle (Step 910). The controller changes the engagement state having been set to the torque transmission state to the torque transmission interruption state (Step 840) upon determination that the detected yaw rate has deviated from the normative yaw rate (Step 910: No), irrespective of the magnitude of the lateral acceleration.

According to this aspect, even when the magnitude of the lateral acceleration is relatively small and therefore, the degree to which the lateral force margins of the primary drive wheels decrease is small, when the actual yaw rate has deviated from the normative yaw rate, the present disclosure apparatus can stabilize the behavior of the four-wheel drive vehicle by stopping the yaw moment control by driving force.

In one aspect of the present disclosure apparatus, the four-wheel drive vehicle further includes a longitudinal acceleration sensor (87) for detecting longitudinal acceleration of the four-wheel drive vehicle. When the accelerator pedal is not operated, the controller determines whether the magnitude (|Gx|) of the detected longitudinal acceleration is equal to or greater than a predetermined longitudinal acceleration threshold (Gxth) (Step 1010). The controller changes the engagement state having been set to the torque transmission state to the torque transmission interruption state (Step 840) upon determination that the magnitude of the detected longitudinal acceleration is equal to or greater than the predetermined longitudinal acceleration threshold (Step 1010: Yes), even when the magnitude of the lateral acceleration is determined to be less than the predetermined lateral acceleration threshold.

When the accelerator pedal is suddenly released while the four-wheel drive vehicle is turning, the four-wheel drive vehicle is likely to change its heading direction toward the inner side of a turning locus (hereinafter referred to as "spontaneous inward turning"). The greater the magnitude of deceleration of the four-wheel drive vehicle, the greater the possibility of occurrence of spontaneous inward turning. If the yaw moment control by driving force is performed in a state in which the spontaneous inward turning easily occurs, the behavior of the four-wheel drive vehicle may become unstable. However, according to this aspect, in the case where the magnitude of deceleration (the magnitude of longitudinal acceleration) of the four-wheel drive vehicle is relatively large, the yaw moment control by driving force is stopped. Therefore, the frequency of occurrence of spontaneous inward turning is reduced, whereby the behavior of the four-wheel drive vehicle can be stabilized. Further, when a large deceleration is generated as a result of the brake pedal being operated, understeer behavior may occur because of decrease of the lateral force margins of the primary drive wheels. However, according to this aspect, the frequency of occurrence of understeer behavior can be reduced.

In the above description, in order to facilitate understanding of the present disclosure, the constituent elements of the disclosure corresponding to those of embodiments of the disclosure which will be described later are accompanied by parenthesized names and/or symbols which are used in the embodiments; however, the constituent elements of the disclosure are not limited to those in the embodiments defined by the names and/or the symbols. Other objects, other features, and attendant advantages of the present disclosure will be readily appreciated from the following description of the embodiments of the disclosure which is made with reference to the accompanying drawings.

DETAILED DESCRIPTION

First Embodiment (Configuration)

Figure 1:
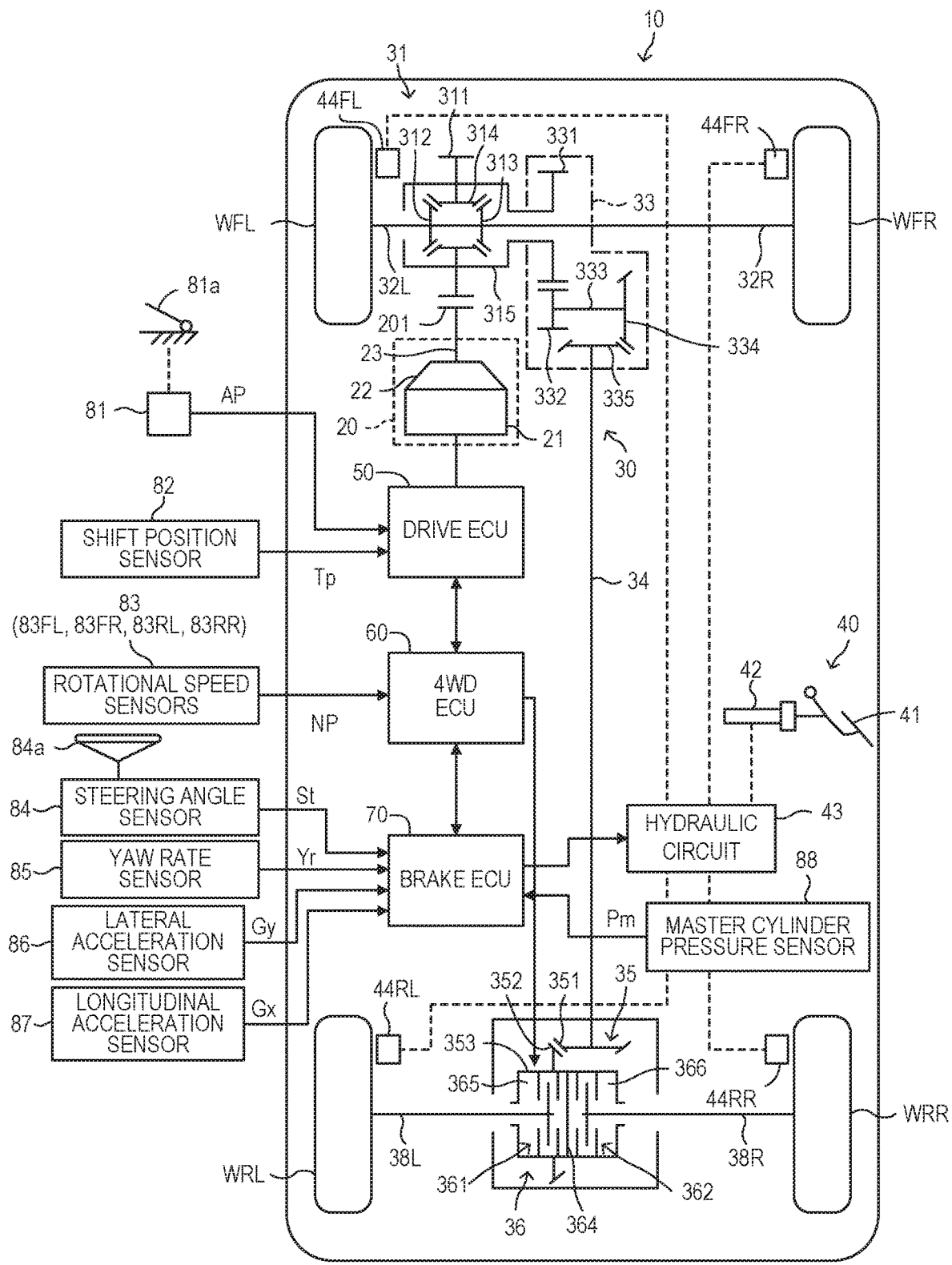
FIG. 1 is a schematic diagram of a travel control apparatus for a four-wheel drive vehicle according to a first embodiment of the present disclosure.

A travel control apparatus for a four-wheel drive vehicle according to a first embodiment of the present disclosure (hereinafter also referred to as the "first apparatus") is applied to a four-wheel drive vehicle (vehicle) 10 as shown in FIG. 1.

The vehicle 10 includes a drive apparatus 20, a power transmission apparatus 30, a brake apparatus 40, a drive ECU 50, a 4WD ECU 60, a brake ECU 70.

The drive apparatus 20 includes an engine main body 21, a primary transmission 22, and an output shaft 23. The engine main body 21 is a spark-ignition-type multi-cylinder internal combustion engine. The drive apparatus 20 generates driving force for driving wheels (a front left wheel WFL, a front right wheel WFR, a rear left wheel WRL, and a rear right wheel WRR) of the vehicle 10. The primary transmission 22 is an automatic transmission which changes the gear (gear ratio) in accordance with the travel state of the vehicle 10. The driving force generated by the engine main body 21 and output from the primary transmission 22 is transmitted to the power transmission apparatus 30 through the output shaft 23. The driving force generated by the drive apparatus 20 is transmitted to the wheels of the vehicle 10 through the power transmission apparatus 30.

The power transmission apparatus 30 includes a differential apparatus for front wheels 31, a front left wheel axle 32L, a front right wheel axle 32R, a transfer gear apparatus 33, a propeller shaft 34, a final gear apparatus for rear wheels 35, a clutch apparatus 36, a rear left wheel axle 38L, a rear right wheel axle 38R.

The differential apparatus for front wheels 31 includes a drive gear 311, a left side gear 312, a right side gear 313, a pinion gear 314, and a front differential case 315. The drive gear 311 is in meshing engagement with a transmission output gear 201 which outputs the driving force generated by the drive apparatus 20. The left side gear 312 is connected directly to a front left wheel axle 32L to which the front left wheel WFL is connected and rotates integrally with the front left wheel axle 32L. The right side gear 313 is connected directly to a front right wheel axle 32R to which the front right wheel WFR is connected and rotates integrally with the front right wheel axle 32R. The pinion gear 314 is in meshing engagement with the left side gear 312 and the right side gear 313. The front differential case 315 is connected directly to the drive gear 311 for integral rotation therewith and accommodates the left side gear 312, the right side gear 313, and the pinion gear 314. The differential apparatus for front wheels 31 having the above-mentioned configuration distributes the driving force generated by the drive apparatus 20 to the front left wheel axle 32L and the front right wheel axle 32R while allowing the front left wheel axle 32L and the front right wheel axle 32R to rotate at different rotational speeds. Accordingly, the driving force from the drive apparatus 20 is always transmitted to the front left wheel WFL and the front right wheel WFR. The front left wheel WFL and the front right wheel WFR to which the driving force is always transmitted will also be referred to as the left primary drive wheel WFL and the right primary drive wheel WFR, respectively. Further, the front left wheel axle 32L and the front right wheel axle 32R will also be referred to as the left primary drive wheel axle 32L and the right primary drive wheel axle 32R, respectively.

The transfer gear apparatus 33 includes an input gear 331, a counter gear 332, a counter shaft 333, a first ring gear 334, and a first pinion gear 335. The input gear 331 is connected directly to the front differential case 315 and rotates integrally with the front differential case 315. The counter gear 332 is in meshing engagement with the input gear 331. The counter gear 332 is fixed to one end of the counter shaft 333, and the first ring gear 334 is fixed to the other end of the counter shaft 333. Accordingly, the first ring gear 334 rotates integrally with the counter gear 332. The first pinion gear 335 is in meshing engagement with the first ring gear 334 and is fixed to a front end portion of the propeller shaft 34. Therefore, the propeller shaft 34 rotates integrally with the first pinion gear 335.

The final gear apparatus for rear wheels 35 includes a second pinion gear 351, a second ring gear 352, and a rear differential case 353. The second pinion gear 351 is fixed to a rear end portion of the propeller shaft 34 and rotates integrally with the propeller shaft 34. The second ring gear 352 is in meshing engagement with the second pinion gear 351. The rear differential case 353 is a cylindrical casing which is disposed coaxially with the rear left wheel axle 38L to which the rear left wheel WRL is connected and the rear right wheel axle 38R to which the rear right wheel WRR is connected. The rear differential case 353 is connected directly to the second ring gear 352. Accordingly, the rear differential case 353 rotates integrally with the second ring gear 352 around the rear left wheel axle 38L and the rear right wheel axle 38R. The rear differential case 353 will also be referred to as the "drive output part" 353.

The clutch apparatus 36 includes a first clutch 361 and a second clutch 362. The first clutch 361 and the second clutch 362 will also be referred to as the "first coupling apparatus 361" and the "second coupling apparatus 362," respectively. In the case where the first clutch 361 and the second clutch 362 are described without distinguishing them from each other, each of the first clutch 361 and the second clutch 362 will simply be referred to as the "clutch."

A partition wall 364 is provided at a central portion of the rear differential case 353 in the axial direction (the lateral direction of the vehicle). A first clutch chamber 365 is formed on the vehicle left side of the partition wall 364, and a second clutch chamber 366 is formed on the vehicle right side of the partition wall 364. The first clutch 361 and the second clutch 362 are accommodated in the first clutch chamber 365 and the second clutch chamber 366, respectively. The structure of the clutch apparatus 36 is well known. The entirety of Japanese Patent Application Laid-Open (kokai) No. 2007-45194 which discloses the structure of the clutch apparatus 36 is incorporated herein by reference. Each of the first clutch 361 and the second clutch 362 is a clutch obtained by combining a multi-disc clutch and an electromagnetic clutch. The first clutch 361 and the second clutch 362 are independently controllable, coupling torque variable clutches whose coupling torques can be changed individually in accordance with instructions from the 4WD ECU 60.

When the coupling torque of the first clutch 361 is set to a "value greater than zero," the engagement state of the first clutch 361; i.e., the state of engagement between the rear differential case 353 and the rear left wheel axle 38L (referred to as the "first engagement state"), is set to a torque transmission state. Similarly, when the coupling torque of the second clutch 362 is set to a "value greater than zero," the engagement state of the second clutch 362; i.e., the state of engagement between the rear differential case 353 and the rear right wheel axle 38R (referred to as the "second engagement state") is set to a torque transmission state. Strictly speaking, the "torque transmission state" is a state in which the coupling torque of the first clutch 361 or the second clutch 362 is set to a value greater than zero; i.e., a state in which torque is transmitted between the rear differential case 353 and the rear left wheel axle 38L or between the rear differential case 353 and the rear right wheel axle 38R. In other words, the torque transmission state is a state in which an engagement surface 371c provided on the rear left wheel axle 38L or an engagement surface 372c provided on the rear right wheel axle 38R rotates respectively while sliding on an engagement surface 371d or 372d provided on the rear differential case 353. In the present example, the torque transmission state means a state in which the coupling torque is set to the maximum value or a value near the maximum value.

Meanwhile, when the coupling torque of the first clutch 361 is set to zero, the first engagement state is set to a torque transmission interruption state. Similarly, when the coupling torque of the second clutch 362 is set to zero, the second engagement state is set to a torque transmission interruption state. In other words, the "torque transmission interruption state" is a state in which the coupling torque of the first clutch 361 or the second clutch 362 is set to zero; i.e., a state in which torque is not transmitted between the rear differential case 353 and the rear left wheel axle 38L or between the rear differential case 353 and the rear right wheel axle 38R. In other words, the torque transmission interruption state is a state in which the rear left wheel axle 38L or the rear right wheel axle 38R rotates freely relative to the rear differential case 353.

Accordingly, the driving force from the drive apparatus 20 is transmitted to the rear left wheel WRL and the rear right wheel WRR when each of the first engagement state and the second engagement state is the torque transmission state and is not transmitted to the rear left wheel WRL and the rear right wheel WRR when each of the first engagement state and the second engagement state is the torque transmission interruption state. The rear left wheel WRL and the rear right wheel WRR to which the driving force from the drive apparatus 20 is transmitted temporarily will also be referred to as the left secondary drive wheel WRL and the right secondary drive wheel WRR, respectively. The rear left wheel axle 38L and the rear right wheel axle 38R will also be referred to as the left secondary drive wheel axle 38L and the right secondary drive wheel axle 38R. Further, the final gear apparatus for rear wheels 35 will also be referred to as the final gear apparatus for secondary drive wheels 35.

Incidentally, the power transmission apparatus 30 is configured such that the front-wheel-side final gear ratio becomes greater than the rear-wheel-side final gear ratio. Namely, the gear ratio of the power transmission apparatus 30 is set such that the rotational speed of the rear differential case 353 becomes higher than the rotational speed of the front differential case 315. When this gear ratio is defined as the ratio (speed increasing ratio) RZ of the rotational speed of the rear differential case 353 to the rotational speed of the front differential case 315, the speed increasing ratio RZ is set to a predetermined ratio greater than "1." More specifically, the speed increasing ratio RZ is the ratio of the speed reduction ratio if of the differential apparatus for front wheels 31 to the speed reduction ratio ir of the final gear apparatus for rear wheels 35 (RZ=if/ir). In the present example, the speed increasing ratio RZ is set to "1.02." In this case, the rotational speed of the rear differential case 353 is 2% higher than the rotational speed of the front differential case 315.

Figure 2:
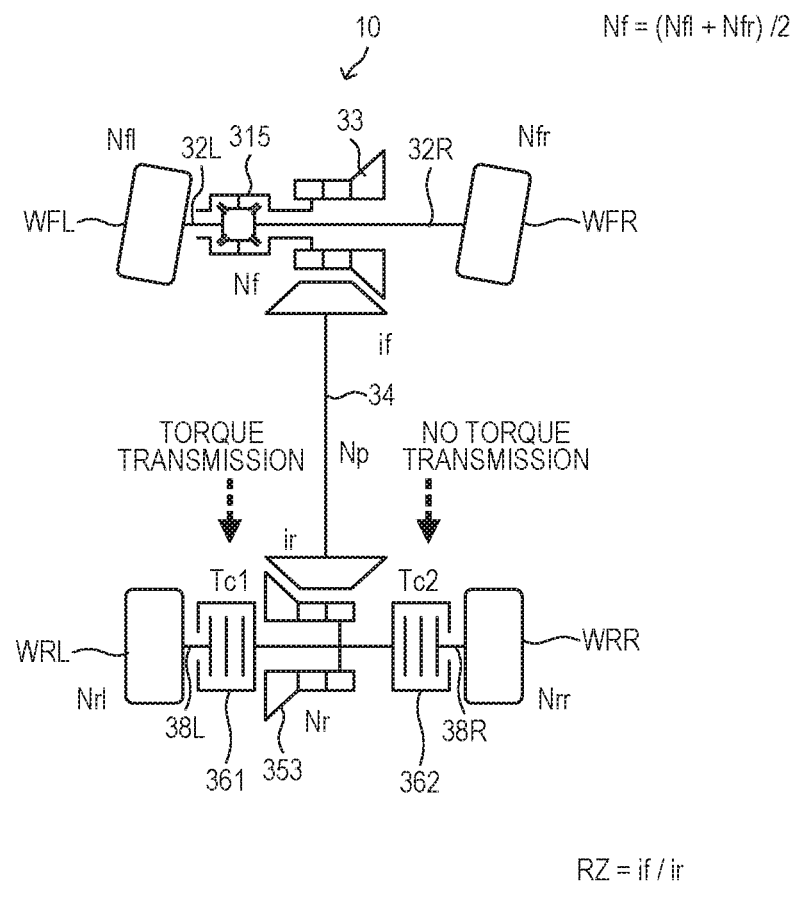
FIG. 2 is a diagram for illustrating the rotational speeds of wheels in the case where the four-wheel drive vehicle is turning rightward.

The speed increasing ratio RZ is set as described above for the following reason. Namely, when the vehicle 10 is turning rightward as shown in FIG. 2, the rotational speed Nfl of the front left wheel WFL is higher than the average rotational speed Nf (=(Nfl+Nfr)/2) of the front wheels, and the rotational speed Nfr of the front right wheel WFR is lower than the average rotational speed Nf of the front wheels.

In this case, if the speed increasing ratio RZ is set to "1," the rotational speed Nrl of the rear left wheel WRL and the rotational speed Nrr of the rear right wheel WRR do not become higher than the average rotational speed Nf of the front wheels. Accordingly, when the first engagement state is set to the torque transmission state, since the rotational speed Nrl of the rear left wheel WRL, which is a drive wheel on the outer side of a turning locus, becomes equal to or lower than the rotational speed Nfl of the front left wheel WFL, braking force is generated by the rear left wheel WRL.

Meanwhile, if the speed increasing ratio RZ is set to 1.02 (greater than "1") as in the present embodiment, although the rotational speed Nrl of the rear left wheel WRL is higher than the average rotational speed Nf of the front wheels, the rotational speed Nr of the rear differential case 353 can become higher than the rotational speed Nrl of the rear left wheel WRL. Accordingly, the drive torque is transmitted from the rear differential case 353 to the rear left wheel WRL. Accordingly, the first apparatus can utilize the driving force of the rear left wheel WRL as force assisting the rightward turn of the vehicle 10. Similarly, in the case where the vehicle 10 turns leftward, the first apparatus, in which the speed increasing ratio RZ is set to 1.02, can utilize the driving force of the rear right wheel WRR as force assisting the leftward turn of the vehicle 10. In other words, when the vehicle 10 is turning, the first apparatus performs control (yaw moment control by driving force) of setting the engagement state of the clutch corresponding to the wheel (one of the rear left wheel WRL and the rear right wheel WRR) located on the outer side of the turning locus (hereinafter referred to as the "turning outer wheel") to the torque transmission state and setting in the engagement state of the clutch corresponding to the wheel located on the inner side of the turning locus (hereinafter referred to as the "turning inner wheel") to the torque transmission interruption state. According to this control, the first apparatus can generate a yaw moment in the turning direction in the vehicle 10. As a result, the turning performance of the vehicle 10 can be enhanced.

Referring to FIG. 1 again, the brake apparatus 40 includes a brake pedal 41, a master cylinder 42, a hydraulic circuit 43, and wheel cylinders 44 (44FL, 44FR, 44RL, and 44RR).

The braking forces of the front left wheel WFL, the front right wheel WFR, the rear left wheel WRL, and the rear right wheel WRR are controlled as a result of the braking pressures of the corresponding wheel cylinders 44FL, 44FR, 44RL, and 44RR being controlled by the hydraulic circuit 43 of the brake apparatus 40. The hydraulic circuit 43 includes an unillustrated reservoir, an unillustrated oil pump, and unillustrated various valve apparatuses, and functions as a brake actuator. As described above, the brake apparatus 40 is a hydraulic brake which controls the braking forces of the wheels by oil pressure.

The drive ECU 50, the 4WD ECU 60, and the brake ECU 70 are interconnected through CAN (controller area network) communication in such a manner that the drive ECU 50, the 4WD ECU 60, and the brake ECU 70 can exchange information with one another. ECU is an abbreviation of an electric control unit and is an electronic circuit which includes, as a main component, a microcomputer including a CPU, a ROM, a RAM, a backup RAM (or non-volatile memory), and an interface I/F. The CPU realizes various functions which will be described later by executing instructions (routines) stored in the memory (ROM).

The drive ECU 50 is electrically connected to various types of sensors, including an accelerator opening sensor 81 and a shift position sensor 82, and receives output signals from these sensors. The accelerator opening sensor 81 generates an output signal representing the depressed amount (hereinafter also referred to as the "accelerator opening") AP of an accelerator pedal 81a provided to be operated by a driver. The shift position sensor 82 generates an output signal representing the shift position Tp of the primary transmission 22 (hereinafter also referred to as the "shift range signal"). When the shift lever of the primary transmission 22 is operated, the shift position Tp is changed to any one of D-range, N-range, R-range, and P-range. The drive ECU 50 is electrically connected to the drive apparatus 20. The drive ECU 50 sends to the drive apparatus 20 various signals for controlling the drive apparatus 20 on the basis of the accelerator opening AP and operation of the unillustrated shift lever.

The 4WD ECU 60 is electrically connected to various types of sensors, including rotational speed sensors 83 (83FL, 83FR, 83RL, and 83RR), and receives output signals from these sensors. Each rotational speed sensor 83 generates one pulse every time a corresponding wheel (actually, a rotor fixed to the wheel) rotates a predetermined angle. The 4WD ECU 60 counts the number NP of pulses generated by the rotational speed sensor 83 per unit time. The 4WD ECU 60 obtains, from the count value, the rotational speed of the wheel for which that rotational speed sensor 83 is provided, and calculates the wheel speed Vw of the wheel on the basis of its rotational speed.

The 4WD ECU 60 is also electrically connected to the final gear apparatus for rear wheels 35 and controls the coupling torques of the first clutch 361 and the second clutch 362 on the basis of the accelerator opening AP, the wheel speeds Vwfl, Vwfr, Vwrl, and Vwrr, etc. It should be noted that the fact that the accelerator opening AP is not zero is the same as the fact that the accelerator pedal 81a is operated, and the fact that the accelerator opening AP is zero is the same as the fact that the accelerator pedal 81a is not operated.

The brake ECU 70 is electrically connected to a steering angle sensor 84, a yaw rate sensor 85, a lateral acceleration sensor 86, a longitudinal acceleration sensor 87, a master cylinder pressure sensor 88, and receives output signals from these sensors. The steering angle sensor 84 generates an output signal representing the steering angle St of a steering wheel 84a provided to be operated by the driver. The yaw rate sensor 85 generates an output signal representing the yaw rate Yr of the vehicle 10. The lateral acceleration sensor 86 generates an output signal representing the lateral acceleration Gy of the vehicle 10. The longitudinal acceleration sensor 87 generates an output signal representing the longitudinal acceleration Gx of the vehicle 10. The master cylinder pressure sensor 88 generates an output signal representing the master cylinder pressure Pm. It should be noted that, the steering angle sensor 84, the yaw rate sensor 85, and the lateral acceleration sensor 86 detect the steering angle St, the yaw rate Yr, and the lateral acceleration Gy, respectively, such that the detected value becomes positive when the direction of steering angle, yaw rate, or lateral acceleration corresponds to the leftward turning direction of the vehicle 10. The longitudinal acceleration sensor 87 detects the longitudinal acceleration Gx such that the detected value becomes positive when the direction of longitudinal acceleration corresponds to the acceleration direction of the vehicle 10.

The brake ECU 70 also calculates target braking forces Fbflt, Fbfrt, Fbrlt, and Fbrrt of the front left wheel WFL, the front right wheel WFR, the rear left wheel WRL, and the rear right wheel WRR on the basis of the master cylinder pressure Pm and controls the braking pressures of the wheel cylinders 44FL, 44FR, 44RL and 44RR such that the braking force of each wheel coincides with the corresponding target braking force.

(Outline of Operation)

As described above, the first apparatus is configured to be able to perform the "yaw moment control by driving force" by utilizing the fact that the speed increasing ratio RZ is set to the predetermined ratio greater than 1. Meanwhile, as described above, when the accelerator pedal 81a is not operated (the accelerator opening AP is zero) in a state in which either one of the first engagement state and the second engagement state has been set to the torque transmission state, driving force is generated at a corresponding rear wheel due to the difference in rotation between the rear differential case 353 and the rear wheel. Therefore, braking force for canceling the driving force generated at the rear wheel is generated at a corresponding front wheel. As a result, the lateral force margin of the front wheel decreases, and understeer behavior becomes more likely to occur. The degree to which the lateral force margin decreases tends to increase when the vehicle is in a critical state of traveling or is travelling on a road whose surface is low in friction coefficient.

In view of the above, the first apparatus is configured such that, when priority must be placed on enhancement of turning performance, one of the first engagement state and the second engagement state which corresponds to the turning outer wheel is set to the torque transmission state, and the other of the first engagement state and the second engagement state which corresponds to the turning inner wheel is set to the torque transmission interruption state. Meanwhile, the first apparatus is configured such that, when priority must be placed on reduction of the frequency of occurrence of understeer behavior, the first engagement state and the second engagement state are set to the torque transmission interruption state.

Figure 3:
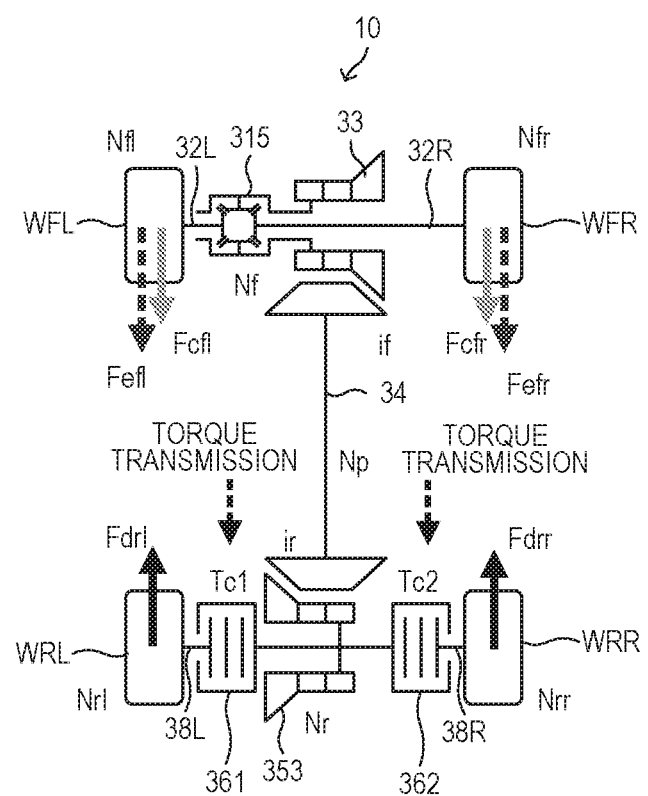
FIG. 3 is a diagram for illustrating the rotational speeds of various portions constituting a power transmission apparatus of the vehicle illustrated in FIG. 1, the rotational speeds of the wheels, and longitudinal forces generated at the wheels.

First, the reason why braking force is generated at a front wheel (the front left wheel WFL or the front right wheel WFR) when the vehicle 10 is traveling by inertia (hereinafter also referred to as "coasting") in a state in which neither the accelerator pedal 81a nor the brake pedal 41 is operated will be described specifically with reference to FIG. 3.

The average rotational speed Nf of the front left wheel WFL and the front right wheel WFR (the rotational speed of the front differential case 315) is calculated in accordance with the following Expression (1). Here, Nfl is the rotational speed of the front left wheel WFL, and Nfr is the rotational speed of the front right wheel WFR. It should be noted that the average rotational speed Nf is equal to the rotational speed of the front differential case 315.

$$Nf=(Nfl+Nfr)/2 \qquad (1)$$

The rotational speed Np of the propeller shaft 34 is calculated in accordance with the following Expression (2) as the product of the average rotational speed Nf of the front wheels and the speed reduction ratio of the differential apparatus for front wheels 31 (hereinafter also referred to as the "front speed reduction ratio") if. In other words, the front speed reduction ratio if is the ratio of the rotational speed Np of the propeller shaft 34 to the average rotational speed Nf of the front wheels.

$$Np=Nf \cdot if \qquad (2)$$

The rotational speed Nr of the rear differential case 353 of the final gear apparatus for rear wheels 35 is calculated in accordance with the following Expression (3). Here, ir is the speed reduction ratio of the final gear apparatus for rear wheels 35 (hereinafter also referred to as the "rear speed reduction ratio"). In other words, the rear speed reduction ratio ir is the ratio of the rotational speed Np of the propeller shaft 34 to the rotational speed Nr of the rear differential case 353.

$$Nr=Np/ir \quad (3)$$

The above-mentioned Expression (3) is represented by the following Expression (4) using the front speed reduction ratio if and the rear speed reduction ratio ir.

$$Nr=Nf·if/ir \quad (4)$$

Since the front speed reduction ratio if is set to a ratio greater than the rear speed reduction ratio ir, the value of if/ir is greater than 1. In the present example, the value of if/ir is set to 1.02. Namely, the rotational speed Nr of the rear differential case 353 is higher than the average rotational speed Nf of the front wheels (Nr>Nf). The value of if/ir corresponds to the speed increasing ratio RZ.

For example, it is assumed that the vehicle 10 is coasting on a straight road. However, the first engagement state has been set to a torque transmission state determined such that the rear left wheel WRL does not slip, and the second engagement state has been set to a torque transmission state determined such that the rear right wheel WRR does not slip. Under such an assumption, the rotational speed Nrl of the rear left wheel WRL and the rotational speed Nrr of the rear right wheel WRR are equal to the average rotational speed Nf of the front wheels. Namely, the rotational speed Nrl of the rear left wheel WRL and the rotational speed Nrr of the rear right wheel WRR are lower than the rotational speed Nr of the rear differential case 353 (Nrl=Nrr<Nr=Nf·if/ir). Accordingly, when the first engagement state is the torque transmission state, a slip occurs at the first clutch 361 due to the difference between the rotational speed Nr of the rear differential case 353 and the rotational speed Nrl of the rear left wheel WRL. Since torque is transmitted from the rear differential case 353 whose rotational speed is high to the rear left wheel axle 38L whose rotational speed is low, drive torque is generated at the rear left wheel axle 38L. Similarly, when the second engagement state is the torque transmission state, a slip occurs at the second clutch 362 due to the difference between the rotational speed Nr of the rear differential case 353 and the rotational speed Nrr of the rear right wheel WRR, and drive torque is generated at the rear right wheel axle 38R whose rotational speed is low. Namely, due to the above-mentioned torque transmitted to the rear left wheel axle 38L and the rear right wheel axle 38R, driving forces Fdrl and Fdrr are generated at the rear left wheel WRL and the rear right wheel WRR, respectively.

Meanwhile, braking forces (i.e., negative longitudinal forces) Fefl and Fefr attributable to engine braking are generated at the front left wheel WFL and the front right wheel WFR, respectively. However, when driving forces (i.e., positive longitudinal forces) are generated at the rear left wheel WRL and the rear right wheel WRR, braking forces (negative longitudinal forces) Fcfl and Fcfr act on the front left wheel WFL and the front right wheel WFR as drag forces against the driving forces generated at the rear left wheel WRL and the rear right wheel WRR (forces for cancelling the driving forces generated at the rear wheels). The above is the reason why braking forces are generated at the front wheels when the vehicle 10 is coasting in a state in which none of the accelerator pedal 81a and the brake pedal 41 are operated.

Figure 4A:
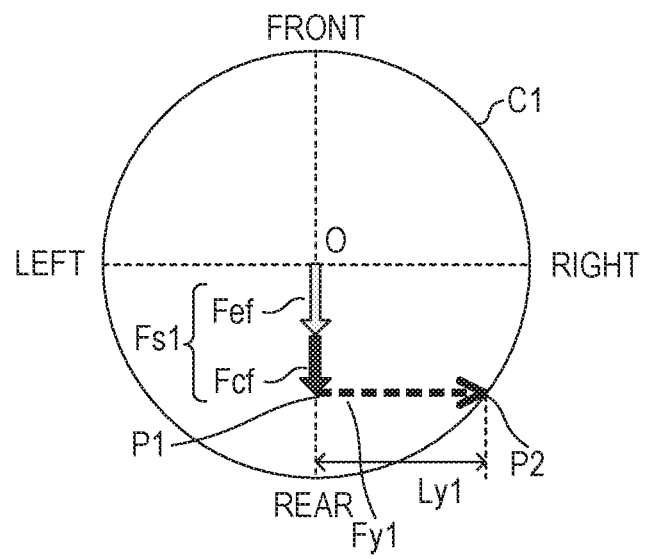
FIG. 4A is a diagram for illustrating the friction circle of the front wheels of the vehicle illustrated in FIG. 1 in the case where driving force is generated at the rear wheels (the engagement state of each coupling apparatus is a torque transmission state).

Next, a friction circle is considered, for example, for a front wheel (the front left wheel WFL or the front right wheel WFR). As shown in FIG. 4(A), in the friction circle C1 of the front wheel, the resultant force Fs1 of the braking force Fef attributable to engine braking and the drag force Fcf against the driving force generated by the corresponding rear wheel (the rear left wheel WRL or the rear right wheel WRR) (braking force for cancelling the driving force) is depicted rearward of the center O of the friction circle C1. Accordingly, the magnitude of lateral force which can be generated by the front wheel is represented by the length Ly1 of a straight line (arrow Fy1) extending from the end P1 of an arrow representing the resultant force Fs1 in a lateral direction (for example, the rightward direction) and intersecting the friction circle C1 at a point P2 (the length Ly1 is equal to the distance between the end P1 and the point P2). The magnitude of lateral force represented by the length Ly1 is the maximum lateral force that the front wheel can generate; namely, "lateral force margin."

Figure 4B:
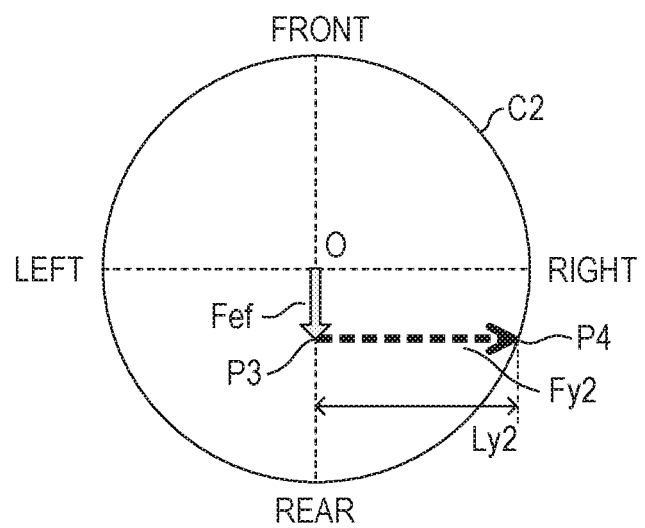
FIG. 4B is a diagram for illustrating the friction circle of the front wheels of the vehicle illustrated in FIG. 1 in the case where no driving force is generated at the rear wheels (the engagement state of each coupling apparatus is a torque transmission interruption state).

Next, the case where each of the first engagement state and the second engagement state is the torque transmission interruption state will be described. In this case, no driving torque is transmitted from the rear differential case 353 to the rear left wheel axle 38L and the rear right wheel axle 38R. Accordingly, as shown in FIG. 4B, only the braking force Fef attributable to engine braking is generated at the front wheel. It should be noted that even when each of the first engagement state and the second engagement state changes from the torque transmission state to the torque transmission interruption state, the vertical load of the front wheel hardly changes. Accordingly, the size (diameter) of the friction circle C2 shown in FIG. 4B is approximately equal to the size of the friction circle C1 shown in FIG. 4A.

In this case, in the friction circle C2, the braking force Fef attributable to engine braking is depicted rearward of the center O of the friction circle C2. Accordingly, in this case, the lateral force margin of the front left wheel WFL is represented by the length Ly2 of a straight line (arrow Fy2) extending from the end P3 of an arrow representing the braking force Fef attributable to engine braking in a lateral direction (for example, the rightward direction) and intersecting the friction circle C2 at a point P4 (the length Ly2 is equal to the distance between the end P3 and the point P4). The length Ly2 of the arrow Fy2 is greater than the length Ly1 of the arrow Fy1 shown in FIG. 4A. Namely, the lateral force margin in the example shown in FIG. 4B is greater than the lateral force margin in the example shown in FIG. 4A.

Accordingly, when the accelerator pedal 81a is not operated in a state in which the engagement state(s) (the first engagement state and/or the second engagement state) of the first clutch 361 and/or the second clutch 362 is set to the torque transmission state, the first apparatus can prevent the lateral force margin(s) of the front wheel(s) from decreasing by setting the first engagement state and the second engagement state to the torque transmission interruption state (the state of FIG. 4B). Namely, the first apparatus sets the first engagement state and the second engagement state to the torque transmission interruption state when priority is placed on the reduction of the frequency of occurrence of understeer behavior.

Figure 5:
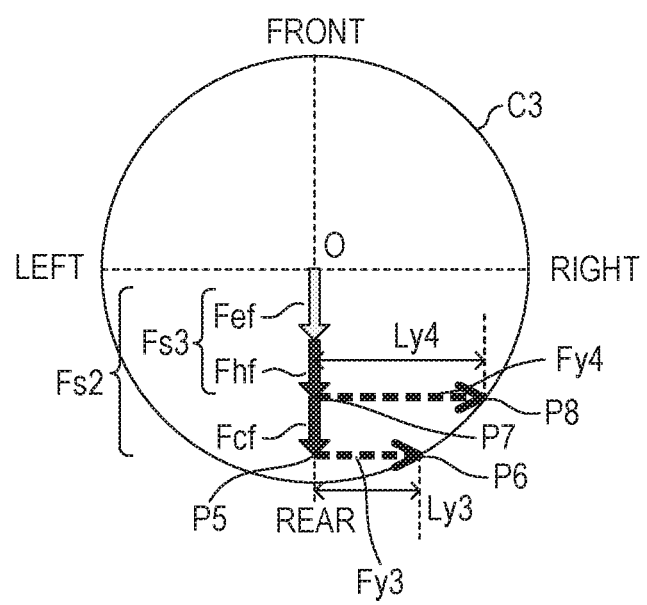
FIG. 5 is a diagram for illustrating the friction circle of the front wheels of the vehicle illustrated in FIG. 1 in the case where driving force is generated at the rear wheels and braking force due to hydraulic braking is generated.

Thought will be given to the case where the brake apparatus 40 (hydraulic brake) generates braking force as a result of the brake pedal 41 being operated in a state in which each of the first engagement state and the second engagement state is the torque transmission state. As shown in FIG. 5, in the friction circle C3 of the front wheel, the resultant force Fs2 of the braking force Fef attributable to engine braking, the braking force Fhf attributable to hydraulic braking, and the braking force Fcf for cancelling the driving force of the rear wheel is depicted rearward of the center O of the friction circle C3. In this case, the lateral force margin of the front wheel is represented by the length Ly3 of a straight line (arrow Fy3) extending from the end P5 of an arrow representing the resultant force Fs2 in a lateral direction (for example, the rightward direction) and intersecting the friction circle C3 at a point P6 (the length Ly3 is equal to the distance between the end P5 and the point P6). The length Ly3 of the arrow Fy3 is smaller than the length Ly1 of the arrow Fy1 shown in FIG. 4A. Accordingly, when the accelerator pedal 81a is not operated and the brake pedal 41 is operated, the lateral force margin of the front wheel decreases further.

However, when each of the first engagement state and the second engagement state is changed to the torque transmission interruption state, the resultant force of braking forces generated at the front wheels is represented by the resultant force Fs3 of the braking force Fef attributable to engine braking and the braking force Fhf attributable to hydraulic braking. In this case, the lateral force margin of the front wheel is represented by the length Ly4 of a straight line (arrow Fy4) extending from the end P7 of an arrow representing the resultant force Fs3 in a lateral direction (for example, the rightward direction) and intersecting the friction circle C3 at a point P8 (the length Ly4 is equal to the distance between the end P7 and the point P8). The length Ly4 of the arrow Fy4 is greater than the length Ly3 of the arrow Fy3. As described above, when the brake pedal 41 is operated, changing each of the first engagement state and the second engagement state to the torque transmission interruption state is effective for securing the lateral force margin of the front wheel.

Figure 6A:
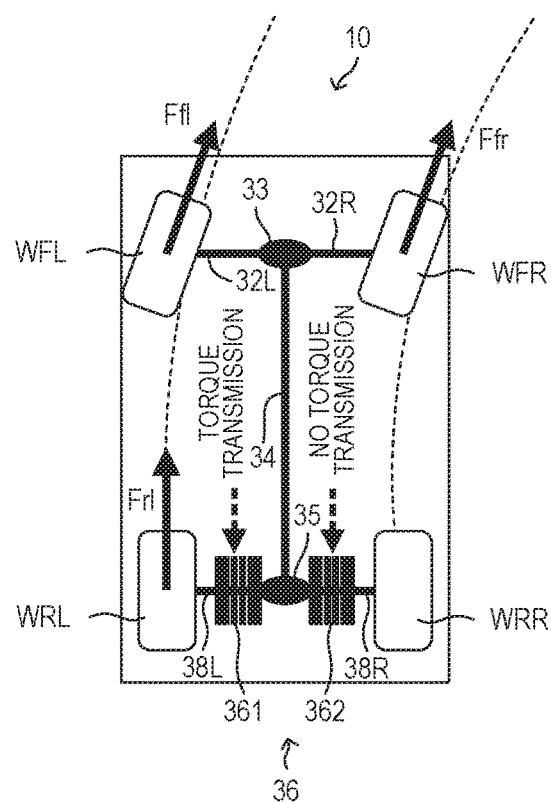
FIG. 6A is a diagram for describing yaw moment control by driving force executed by the travel control apparatus of the vehicle illustrated in FIG. 1 for the case where the vehicle is turning rightward.

Next, the above-mentioned "yaw moment control by driving force" will be described more specifically. For example, in the case where the vehicle 10 is turning rightward (is travelling along a rightward curved road) as shown in FIG. 6A, the first apparatus sets the engagement state (the first engagement state) of the first clutch 361 for the rear left wheel WRL corresponding to the turning outer wheel to the torque transmission state and sets the engagement state (the second engagement state) of the second clutch 362 for the rear right wheel WRR corresponding to the turning inner wheel to the torque transmission interruption state. In this case, driving force Ffl is generated at the front left wheel WFL, driving force Ffr is generated at the front right wheel WFR, and driving force Frl is generated at the rear left wheel WRL. As a result, a rightward (clockwise) yaw moment can be generated, whereby the turning performance of the vehicle 10 can be enhanced.

Figure 6B:
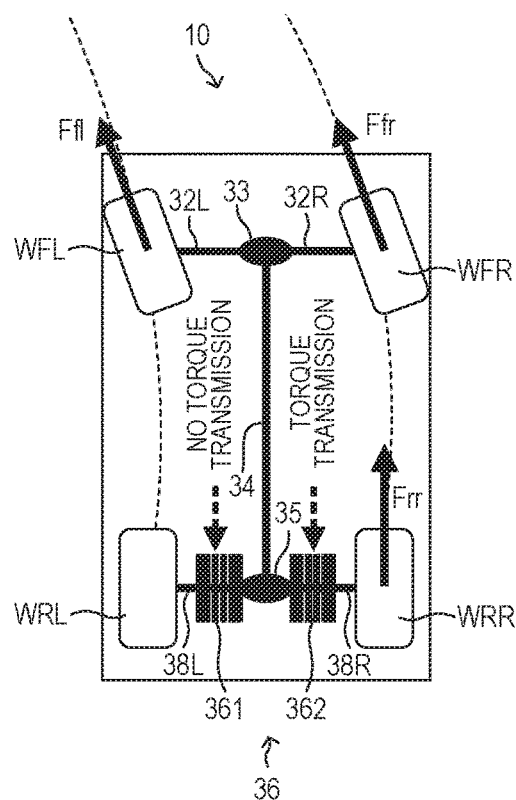
FIG. 6B is a diagram for describing yaw moment control by driving force executed by the travel control apparatus of the vehicle illustrated in FIG. 1 for the case where the vehicle is turning leftward.

Meanwhile, in the case where the vehicle 10 is turning leftward (is travelling along a leftward curved road) as shown in FIG. 6B, the first apparatus sets the first engagement state to the torque transmission interruption state and sets the second engagement state to the torque transmission state. In this case, driving force Ffl is generated at the front left wheel WFL, driving force Ffr is generated at the front right wheel WFR, and driving force Frr is generated at the rear right wheel WRR. As a result, a leftward (counterclockwise) yaw moment can be generated, whereby the turning performance of the vehicle 10 can be enhanced. Accordingly, in the case where priority must be placed on the enhancement of turning performance, the first apparatus sets one of the first engagement state and the second engagement state which corresponds to the turning outer wheel to the torque transmission state, and sets the other of the first engagement state and the second engagement state which corresponds to the turning inner wheel to the torque transmission interruption state.

Here, the lateral force acting on the front wheels during turning of the vehicle 10 is considered. For example, in the case where the vehicle 10 travels on a curved road section and straight road sections before and after the curved road section, in a turn beginning period, including a period in which the vehicle 10 traveling on the straight road section before the curved road section enters the curved road section, the steering angle absolute value |St| is relatively small, and the turning radius is relatively large. Similarly, in a turn ending period, including a period in which the vehicle 10 traveling on the curved road section enters the straight road section after the curved road section, the steering angle absolute value |St| is relatively small, and the turning radius is relatively large. In contrast, in a turn intermediate period which is a period between the turn beginning period and the turn ending period, the steering angle absolute value |St| is relatively large, and the turning radius is relatively small. Accordingly, the magnitude |Gy| of the lateral acceleration of the vehicle 10 is relatively small in the turn beginning period and the turn ending period, and therefore, the lateral forces generated at the front wheels are relatively small. Meanwhile, in the turn intermediate period, since the magnitude |Gy| of the lateral acceleration of the vehicle 10 is relatively large, the lateral forces generated at the front wheels are relatively large. It is understood from the above that a sufficiently large lateral force margin must be secured in the turn intermediate period.

Accordingly, in the case where the accelerator pedal 81a is not operated (when the accelerator opening AP is zero), in the turn beginning period and the turn ending period of the vehicle 10, the enhancement of the turning performance of the vehicle 10 by continuing the yaw moment control by driving force may be prioritized; however, in the turn intermediate period, the securement of the lateral force margins of the front wheels by stopping the yaw moment control by driving force may be prioritized. In other words, in the turn beginning period and the turn ending period of the vehicle 10, the first engagement state or the second engagement state in the torque transmission state may be maintained; however, in the turn intermediate period, the first engagement state or the second engagement state may be changed from the torque transmission state to the torque transmission interruption state.

In view of the above, the first apparatus is configured as follows. In the case where the accelerator pedal 81a is not operated (the accelerator opening AP is rendered zero), during a period during which the vehicle 10 is turning, the first apparatus stops the "yaw moment control by driving force," thereby reducing the frequency of occurrence of understeer behavior of the vehicle 10. However, in the case where the magnitude |Gy| of lateral acceleration is relatively small (e.g., the turn period of the vehicle 10 is the turn beginning period or the turn ending period), the first apparatus performs (maintains) the "yaw moment control by driving force," thereby placing priority on the enhancement of the turning performance of the vehicle 10. Hereinafter, "control of stopping the yaw moment control by driving force" will also be referred to as "torque transmission interruption control."

The first apparatus determines that the vehicle 10 is turning when all the following four conditions are satisfied. Hereinafter, the four conditions will be referred to as the "turning conditions." It should be noted that the turning conditions are the same as conditions for permitting the performance of the "yaw moment control by driving force."
<Turning Conditions>
(1) Steering angle midpoint learning has been completed.
(2) Shift range signal indicates the D range.
(3) The body speed Vb of the vehicle 10 is higher than a predetermined speed threshold Vbth.
(4) The steering angle absolute value |St| is greater than a predetermined steering angle threshold Stth.

The first apparatus performs the steering angle midpoint learning as follows. After an unillustrated ignition key switch is switched from an off position to an on position, the first apparatus is configured to sample the detection signal of the steering angle sensor 84 at the time when a "predetermined learning condition" is satisfied, and learns the steering angle midpoint through statistical processing of the sampled detection signal.

The predetermined learning condition is satisfied upon simultaneous satisfaction of a "vehicle straight travel condition" that the vehicle 10 travels straight and a "non-steering condition" that the steering wheel 84a is not turned. Pieces of information used for determining whether the vehicle straight travel condition is satisfied include, for example, the yaw rate Yr, the lateral acceleration Gy, and the difference between the wheel speed of the front left wheel WFL and the wheel speed of the front right wheel WFR. Pieces of information used for determining whether the non-steering condition is satisfied include, for example, steering torque and steering angular velocity. The method of learning the steering angle midpoint is well known and is disclosed in, for example, Japanese Patent Application Laid-Open (kokai) No. 2017-105277. This disclosure is incorporated into the specification of the present application by reference.

The first apparatus calculates the body speed Vb of the vehicle 10 on the basis of the pulses generated by the rotational speed sensors 83. More specifically, the first apparatus calculates the wheel speeds Vwfl, Vwfr, Vwrl, and Vwrr on the basis of the numbers of pulses generated per unit time, and calculates, as the body speed Vb of the vehicle 10 the average of three wheel speeds selected from the four wheel speeds by removing the highest wheel speed.

However, the first apparatus is configured such that, even when the vehicle 10 is turning; i.e., all the above-mentioned turning conditions are satisfied, the first apparatus performs the "torque transmission interruption control" in the turn intermediate period as described above. During the turn intermediate period, the lateral acceleration Gy of the vehicle 10 is relatively high. Accordingly, the condition for determining that the turn period is the turn intermediate period is a condition that the "magnitude |Gy| of the lateral acceleration is equal to or greater than a predetermined lateral acceleration threshold Gyth."

Meanwhile, in the case where the brake pedal 41 is being operated (i.e., braking is being performed) during coasting, as described above, the lateral force margins of the front wheels decrease greatly. Accordingly, at that time, understeer behavior easily occurs. In view of this, the first apparatus is configured such that, in the case where the brake pedal 41 is being operated, the first apparatus may perform the "torque transmission interruption control" even when the vehicle 10 is turning (the turn beginning period or the turning ending period). In other words, in the case when the brake pedal 41 is being operated, the first apparatus does not perform the yaw moment control by driving force even when the vehicle 10 is in the turn beginning period or the turning ending period. Further, the first apparatus is configured such that when the brake pedal 41 is operated in a state in which the yaw moment control by driving force is being performed in the turn beginning period or the turning ending period, the first apparatus stops the yaw moment control by driving force.

Notably, during straight coasting, since the differences between the rotational speed of the rear differential case 353 and the rotational speeds of the rear wheels are maximum, the lateral force margins of the front wheels become small. Also, performance of the yaw moment control by driving force is unnecessary. Therefore, the first apparatus places priority on the reduction of the frequency of occurrence of understeer behavior. Namely, during straight coasting, the first apparatus sets each of the first engagement state and the second engagement state to the torque transmission interruption state.

In summary, in the case where the first engagement state and/or the second engagement state has been set to the torque transmission state, the first apparatus performs the "torque transmission interruption control" when at least one of the following three conditions is satisfied.
<Conditions for Preforming Torque Transmission Interruption Control>
(First condition) The accelerator pedal 81a is not operated, the brake pedal 41 is not operated, and in such a state, the above-mentioned turning conditions are satisfied, and the magnitude |Gy| of the lateral acceleration is equal to or greater than the predetermined lateral acceleration threshold Gyth.
(Second condition) The accelerator pedal 81a is not operated and the brake pedal 41 is being operated (i.e., braking is being performed).
(Third condition) The accelerator pedal 81a is not operated, the brake pedal 41 is not operated, and in such a state, the above-mentioned turning conditions are not satisfied.

Figure 7:
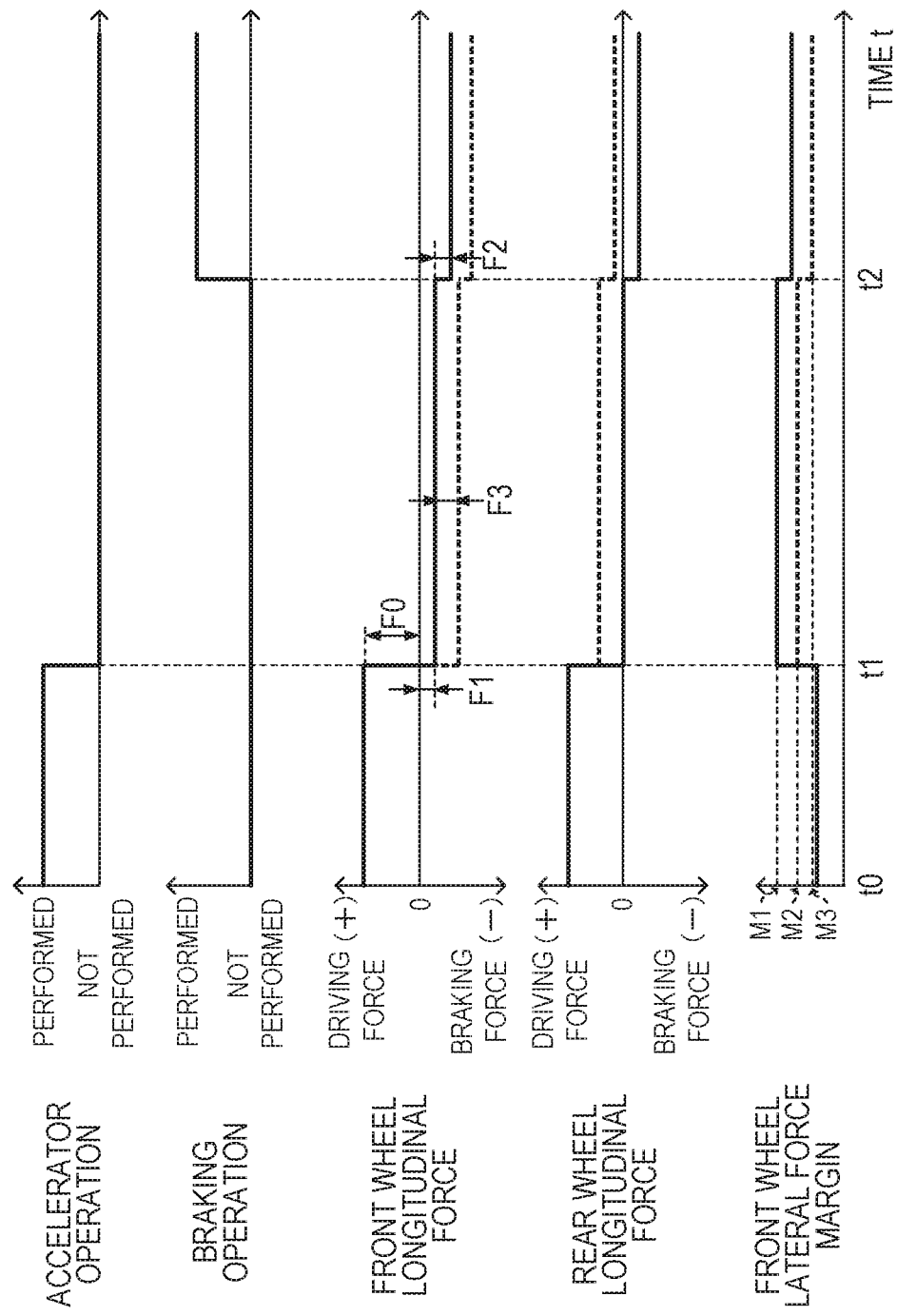
FIG. 7 is a time chart illustrating time-course changes in accelerator operation, brake operation, front wheel longitudinal force, rear wheel longitudinal force, and front wheel lateral force margin during coupling control performed by the travel control apparatus of the vehicle illustrated in FIG. 1.

Next, while referring to FIG. 7, the operation of the "torque transmission interruption control" in the case where the yaw moment control by driving force is performed will be described through comparison with the case where the torque transmission interruption control is not performed. FIG. 7 shows time-course changes in accelerator operation, brake operation, front wheel longitudinal force, rear wheel longitudinal force, and front wheel lateral force margin for the case where the vehicle 10 is travelling straight and each of the first engagement state and the second engagement state is set to the torque transmission state at time t0.

As shown in FIG. 7, at time t1, the accelerator operation is changed from "performed" to "not performed." Namely, at time t1, the operation of the accelerator pedal 81a is stopped. Further, at time t2, the brake operation is changed from "performed" to "not performed." Namely, at time t2, the operation of the brake pedal 41 is started. As to the accelerator operation and the brake operation, whether the accelerator operation and the brake operation are performed or not performed, rather than the actual operation amounts of the accelerator pedal 81a and the brake pedal 41, are shown.

In the present example, at time t0 before time t1 at which the accelerator operation is stopped, driving force (i.e., positive longitudinal force) is generated at each of the front wheels and the rear wheels. The magnitude of this driving force is represented by F0 in FIG. 7. At that time, the lateral force margin of the front wheels is expected to be a relatively small value due to the driving force generated at the front wheels.

This state continues until time t11 at which the operation of the accelerator pedal 81a is stopped (the accelerator opening AP is rendered zero). Namely, generation of the driving force of the front wheels and generation of the driving force of the rear wheels continue until time t1. Similarly, the lateral force margin of the front wheels is maintained at a relatively small value until time t1.

In the case where the torque transmission interruption control is performed, for example, at time 1, as indicated by a solid line in FIG. 7, in place of driving force, braking force (i.e., negative longitudinal force) attributable to engine braking is generated at the front wheels. The magnitude of the braking force attributable to engine braking is represented by F1 in FIG. 7. This magnitude F1 is maintained until time t2. Meanwhile, since the rear wheels are free (rotate freely), neither driving force nor braking force is generated at the rear wheels until time t2. Further, the lateral force margin of the front wheels increases at time t1 because the magnitude F1 of the the braking force attributable to engine braking is smaller than the magnitude F0 of the driving force.

When the brake pedal 41 is depressed at time t2, braking force (negative longitudinal force) attributable to hydraulic braking is generated at the front wheels. The magnitude of the braking force attributable to hydraulic braking is represented by F2 in FIG. 7. After time t2, the lateral force margin of the front wheels becomes lower than the lateral force margin in the period between time t1 and time t2 because of application of the braking force attributable to hydraulic braking to the front wheels. The above is the operation when the first apparatus performs the torque transmission interruption control.

In contrast, in an assumed case where the torque transmission interruption control is not performed even when the operation of the accelerator pedal 81a is stopped (the operation amount is rendered zero), at time t1, driving force (positive longitudinal force) is generated at the rear wheels. As a result, at the front wheels, in addition to the braking force attributable to engine braking, the braking force (negative longitudinal force) for cancelling the driving force generated at the rear wheels is generated. The magnitude of the braking force for cancelling the driving force generated at the rear wheels is represented by F3. Namely, the magnitude of the braking force generated at the front wheels is (F1+F3).

Accordingly, at that time, the lateral force margin M2 of the front wheels becomes smaller than the lateral force margin M1 in the case where the torque transmission interruption control is performed. Further, when the brake pedal 41 is depressed at time t2, under the above-mentioned assumption, the lateral force margin of the front wheels further decreases to a lateral force margin M3.

The above-mentioned example is an example in which the vehicle 10 is travelling straight; however, the above description similarly applies to the case where the vehicle 10 is turning. Accordingly, the first apparatus can prevent the lateral force margin of the front left wheel WFL from decreasing by performing the torque transmission interruption control when any one of the above-mentioned first through third conditions is satisfied.

(Specific Operation)
<Coupling Control>

Actual operation of the first apparatus will now be described with reference to FIG. 8. The CPU of the 4WD ECU 60 (hereinafter simply referred to as the "CPU") executes a coupling control routine illustrated by a flowchart in FIG. 8 every time a constant time elapses. In the below, the operation will be described for each of different cases.

(1) The Case where the Accelerator Pedal is being Operated

The CPU starts the routine from Step 800 at a predetermined timing and proceeds to Step 810 so as to determine whether "at least one of the currently set command value of the coupling torque of the first clutch 361 (hereinafter referred to as the "first torque command value") Tc1* and the currently set command value of the coupling torque of the second clutch 362 (hereinafter referred to as the "second torque command value") Tc2* is a "torque corresponding to the torque transmission state." Namely, the CPU determines at Step 810 whether at least one of the first engagement state and the second engagement state is the torque transmission state. It should be noted that the first torque command value Tc1* and the second torque command value Tc2* are set in a torque command value setting routine which is separately executed by the CPU of the 4WD ECU 60.

In the case where neither the first torque command value Tc1* nor the second torque command value Tc2* is a torque corresponding to the torque transmission state (i.e., in the case where each of the first engagement state and the second engagement state is the torque transmission interruption state), the CPU makes a "No" determination at Step 810 and proceeds directly to Step 895 so as to tentatively terminate the present routine. Namely, in this case, the CPU does not need to perform the torque transmission interruption control.

Meanwhile, in the case where at least one of the first torque command value Tc1* and the second torque command value Tc2* is a torque corresponding to the torque transmission state, the CPU makes a "Yes" determination at Step 810 and proceeds to Step 820 so as to determine whether the accelerator pedal 81a is being operated (whether the accelerator is ON). Under the above-mentioned assumption, the accelerator pedal 81a is being operated. Accordingly, the CPU makes a "Yes" determination at Step 820 and proceeds to Step 895 so as to tentatively terminate the present routine. As described above, in the case where the accelerator pedal 81a is being operated, since braking forces for cancelling the driving forces of the rear wheels are not generated at the front wheels, the CPU does not perform the torque transmission interruption control.

(2) The Case where the Accelerator Pedal is not Operated and the Brake Pedal is being Operated Below, the description will be continued under the assumption that either one of the first torque command value Tc1* and the second torque command value Tc2* has been set to a torque corresponding to the "torque transmission state."

When the CPU starts the routine from Step 800 and proceeds to Step 810, the CPU makes a "Yes" determination and proceeds to Step 820. Under the above-mentioned assumption, the accelerator pedal 81a is not operated. Accordingly, the CPU makes a "No" determination at Step 820 and proceeds to Step 830 so as to determine whether the vehicle 10 is being braked. In the present embodiment, the determination as to whether the vehicle 10 is being braked is made by determining whether the master cylinder pressure Pm detected by the master cylinder pressure sensor 88 is equal to or greater than a predetermined pressure threshold Pmth. In other words, the fact that the master cylinder pressure Pm is equal to or greater than the predetermined pressure threshold Pmth is the same as the fact that the brake pedal 41 is being operated, and the fact that the master cylinder pressure Pm is less than the predetermined pressure threshold Pmth is the same as the fact that the brake pedal 41 is not operated.

Under the above-mentioned assumption, since the brake pedal 41 is being operated, the vehicle 10 is being braked. Accordingly, the CPU makes a "Yes" determination at Step 830 and proceeds to Step 840 so as to perform the torque transmission interruption control. Namely, the CPU sets both the engagement states of the first clutch 361 and the second clutch 362 (the first engagement state and the second engagement state) to the torque transmission interruption state. In other words, the CPU sets each of the first torque command value Tc1* and the second torque command value Tc2* to zero. Subsequently, the CPU proceeds to Step 895 and tentatively terminates the present routine.

(3) In the Case where the Accelerator Pedal is not Operated and the Brake Pedal is not Operated, and the Vehicle is Turning in this State The CPU makes a "Yes" determination at Step 810 and proceeds to Step 820. The CPU then makes a "No" determination at Step 820 and proceeds to Step 830. Under the above-mentioned assumption, the vehicle 10 is not being braked. Namely, the master cylinder pressure Pm is less than the predetermined pressure threshold Pmth. Accordingly, the CPU makes a "No" determination at Step 830 and proceeds to Step 850 so as to determine whether the vehicle 10 is turning. The determination as to whether the vehicle 10 is turning is made by determining whether all the above-mentioned turning conditions are satisfied.

Under the above-mentioned assumption, the vehicle 10 is turning. Namely, all the above-mentioned turning conditions are satisfied. Accordingly, the CPU makes a "Yes" determination at Step 850 and proceeds to Step 860 so as to determine whether the magnitude |Gy| of the lateral acceleration is equal to or greater than a predetermined lateral acceleration threshold Gyth.

In the case where the magnitude |Gy| of the lateral acceleration is equal to or greater than the predetermined lateral acceleration threshold Gyth, the CPU makes a "Yes" determination at Step 860 and proceeds to Step 840 so as to perform the torque transmission interruption control. Subsequently, the CPU proceeds to Step 895 and tentatively terminates the present routine. As described above, in the case where the vehicle 10 is turning and the magnitude |Gy| of the lateral acceleration is relatively large, the CPU places priority on the securement of the lateral force margins of the front wheels by performing the torque transmission interruption control.

Meanwhile, in the case where the magnitude |Gy| of the lateral acceleration is less than the predetermined lateral acceleration threshold Gyth, the CPU makes a "No" determination at Step 860 and proceeds directly to Step 895 so as to tentatively terminate the present routine. Namely, in the case where the magnitude |Gy| of the lateral acceleration is relatively small, the CPU places priority on the enhancement of the turning performance of the vehicle 10 by continuing the yaw moment control by driving force.

(4) In the Case where the Accelerator Pedal is not Operated, the Brake Pedal is not Operated, and the Vehicle is not Turning in this State When the CPU starts the routine from Step 800 at a predetermined timing, the CPU makes a "Yes" determination at Step 810, a "No" determination at Step 820, and a "No" determination at Step 830. Subsequently, the CPU proceeds to Step 850. Under the above-mentioned assumption, the vehicle 10 is not turning. Namely, the above-mentioned turning conditions are not satisfied. Accordingly the CPU makes a "No" determination at Step 850 and proceeds directly to Step 840 so as to perform the torque transmission interruption control. Subsequently, the CPU proceeds to Step 895 and tentatively terminates the present routine. As described above, in the case where the accelerator pedal 81a is not operated, the brake pedal 41 is not operated, and the vehicle 10 is not turning (for example, the vehicle 10 is travelling straight), the CPU places priority on the securement of the lateral force margins of the front wheels by performing the torque transmission interruption control.

As described above, the first apparatus is applied to the vehicle 10 in which the ratio RZ of the rotational speed of the rear differential case (the drive output part) 353 to the average of the rotational speed of the front left wheel axle 32L and the rotational speed of the front right wheel axle 32R is set to a predetermined ratio greater than 1. The first apparatus permits the performance of the yaw moment control by driving force upon satisfaction of the yaw moment control conditions which are satisfied upon satisfaction of at least a body speed condition that the body speed Vb is higher than the predetermined speed threshold Vbth and a steering angle condition that the steering angle absolute value |St| is greater than the steering angle threshold Stth.

In the case where at least one of the first engagement state and the second engagement state has been set to the torque transmission state as a result of performance of the yaw moment control by driving force, the first apparatus is configured to determine whether at least one of first through third conditions is satisfied, wherein the first condition is that the accelerator pedal 81a is not operated and the brake pedal 41 is not operated, and in such a state, the vehicle 10 is turning and the magnitude |Gy| of the lateral acceleration of the vehicle 10 is equal to or greater than the predetermined lateral acceleration threshold Gyth, the second condition is that the accelerator pedal 81a is not operated and the brake pedal 41 is being operated; and the third condition is that the accelerator pedal 81a is not operated and the brake pedal 41 is not operated, and the vehicle 10 is not turning in such a state.

It should be noted that the expression "at least one of the first engagement state and the second engagement state has been set to the torque transmission state" encompasses the case where one of the first engagement state and the second engagement state which corresponds to the rear wheel on the outer side of the turning locus is set to the torque transmission state, and the other of the first engagement state and the second engagement state which corresponds to the rear wheel on the inner side of the turning locus is set to the torque transmission interruption state.

Further, when the first apparatus determines that one of the first, second, and third conditions is satisfied, the first apparatus is configured to set the first engagement state and the second engagement state to the torque transmission interruption state. In other words, the first apparatus is configured to change the engagement state which is one of the first engagement state and the second engagement state and has been set to the torque transmission state to the torque transmission interruption state.

Accordingly, in the case where the first apparatus is performing the yaw moment control by driving force, the first apparatus performs the torque transmission interruption control when the accelerator pedal 81a is not operated and the magnitude |Gy| of the lateral acceleration is equal to or greater than the lateral acceleration threshold Gyth. As a result, the first apparatus can decrease the degree of reduction of the lateral force margins of the front wheels (primary drive wheels), and consequently, decrease the frequency of occurrence of understeer behavior. In other words, the first apparatus can simultaneously achieve the reduction of the frequency of occurrence of understeer behavior and the enhancement of turning performance through the "yaw moment control by driving force."

Second Embodiment

Next, a travel control apparatus for a four-wheel drive vehicle according to a second embodiment of the present disclosure (hereinafter referred to as the "second apparatus") will be described. The second apparatus differs from the first apparatus only in the point that, even in the case where the vehicle is turning and the magnitude |Gy| of the lateral acceleration is less than the predetermined lateral acceleration threshold Gyth, the second apparatus immediately stops the yaw moment control by driving force (performs the torque transmission interruption control) when the actual yaw rate of the vehicle 10 has deviated from a normative yaw rate. Accordingly, this difference will be mainly described below.

<Normative Yaw Rate>

A normative yaw rate Ym is calculated in accordance with the following Expression (5). In Expression (5), N is the steering gear ratio of the steering wheel 84a, L is the wheelbase of the vehicle 10, and Kh is the stability factor of the vehicle 10. Namely, the normative yaw rate Ym is calculated on the basis of at least the steering angle St and the body speed Vb of the vehicle 10.

$$Ym = Vb \cdot (St/N)/[(1+Kh \cdot Vb^2) \cdot L] \quad (5)$$

Further, the deviation ΔY from the actual yaw rate Yr detected by the yaw rate sensor 85 is calculated in accordance with the following Expression (6).

$$\Delta Y = |Ym - Yr| \quad (6)$$

Further, a drift state quantity DS of the vehicle 10 representing the steering state of the vehicle 10 is calculated in accordance with the following Expression (7).

$$DS = \text{sign} Yr \cdot (Ym - Yr) \quad (7)$$

In Expression (7), signYr is a function representing the sign of the actual yaw rate Yr. When the actual yaw rate Yr assumes a positive value, the value of signYr becomes 1, and when the actual yaw rate Yr assumes a negative value, the value of signYr becomes −1. As described above, it should be noted that the yaw rate is detected such that the yaw rate assumes a positive value when the direction of yaw coincides with the leftward turning direction.

When the vehicle 10 is in an understeer state, the drift state quantity DS becomes greater than 0 (DS>0). Meanwhile, when the vehicle 10 is in an oversteer state, the drift state quantity DS becomes smaller than 0 (DS<0). Namely, when the drift state quantity DS assumes a positive value, it shows that the vehicle 10 is in the understeer state, and the greater the value of the drift state quantity DS, the greater the degree of understeer. In contrast, when the drift state quantity DS assumes a negative value, it shows that the vehicle 10 is in the oversteer state, and the greater the absolute value of the drift state quantity DS, the greater the degree of oversteer.

When the above-mentioned deviation ΔY (drift state quantity absolute value |DS|) increases, the degree of understeer or oversteer of the vehicle 10 increases. Therefore, the second apparatus immediately stops the yaw moment control by driving force (performs the torque transmission interruption control) when the drift state quantity absolute value |DS| exceeds a predetermined drift state quantity threshold DSth.

(Specific Operation)
<Coupling Control>

Actual operation of the second apparatus will now be described with reference to FIG. 9. The CPU of a 4WD ECU 60A of the second apparatus executes a coupling control routine illustrated by a flowchart in FIG. 9 every time a constant time elapses. In FIG. 9, it should be noted that steps identical with the steps shown in FIG. 8 are denoted by the same step numbers. Further, the actual operation will be described under the assumption that one of the first engagement state and the second engagement state has been set to the torque transmission state.

In the case where accelerator operation is not performed, braking is not performed, and the vehicle 10 is turning, the CPU starts the routine from Step 900 at a predetermined timing and proceeds to Step 810. At Step 810 through Step 860, the CPU performs the same processings as those of Step 810 through Step 860 shown in FIG. 8. Therefore, the processings of Step 810 through Step 860 will not be described redundantly.

In accordance with the above-mentioned assumption, the CPU makes a "Yes" determination at Step 810 and proceeds to Step 820, and the CPU makes a "No" determination at Step 820 and proceeds to Step 830. Subsequently, the CPU makes a "No" determination at Step 830 and proceeds to Step 850. The CPU makes a "Yes" determination at Step 850 and proceeds to Step 910 so as to determine whether the actual yaw rate Yr is within the range of the normative yaw rate Ym; namely, whether the drift state quantity absolute value |DS| is equal to or less than the predetermined drift state quantity threshold DSth.

In the case where the drift state quantity absolute value |DS| is equal to or less than the predetermined drift state quantity threshold DSth, the CPU makes a "Yes" determination at Step 910 and proceeds to Step 860. Meanwhile, in the case where the drift state quantity absolute value |DS| is greater than the predetermined drift state quantity threshold DSth, the CPU makes a "No" determination at Step 910, proceeds directly to Step 840 so as to perform the torque transmission interruption control, and proceeds to Step 995 so as to tentatively terminate the present routine.

Namely, even in the case where the magnitude |Gy| of the lateral acceleration is relatively small, when the actual yaw rate Yr deviates from the normative yaw rate range, the second apparatus immediately performs the torque transmission interruption control, thereby placing priority on the reduction of the frequency of occurrence of understeer behavior.

As described above, in the case where at least one of the first engagement state and the second engagement state has been set to the torque transmission state, the second apparatus determines whether at least one of the following four conditions is satisfied.

Condition 1a: the accelerator pedal 81a is not operated and the brake pedal 41 is not operated; and in such a state, the vehicle 10 is turning and the actual yaw rate Yr of the vehicle 10 has deviated from the normative yaw rate Ym.

Condition 2: the accelerator pedal 81a is not operated and the brake pedal 41 is being operated.

Condition 3: the accelerator pedal 81a is not operated and the brake pedal 41 is not operated; and the vehicle 10 is not turning in such a state.

Condition 4: the accelerator pedal 81a is not operated and the brake pedal 41 is not operated; and in such a state, the vehicle 10 is turning, the actual yaw rate Yr of the vehicle 10 is within the range of the normative yaw rate Ym, and the magnitude |Gy| of the lateral acceleration of the vehicle 10 is equal to or greater than the predetermined lateral acceleration threshold Gyth.

Further, the second apparatus is configured to set the first engagement state and the second engagement state to the torque transmission interruption state when any of Condition 1a through Condition 4 is satisfied.

Accordingly, even in the case where the vehicle 10 is turning and the magnitude |Gy| of the lateral acceleration is relatively small, the second apparatus stops the yaw moment control by driving force when the actual yaw rate Yr deviates from the normative yaw rate Ym determined in accordance with the travel state of the vehicle 10. Thus, it is possible to prevent the motion state of the vehicle 10 from becoming the understeer state or the oversteer state.

Third Embodiment

Next, a travel control apparatus for a four-wheel drive vehicle according to a third embodiment of the present disclosure (hereinafter referred to as the "third apparatus") will be described. The third apparatus differs from the first apparatus only in the point that, even in the case where none of the accelerator pedal 81a and the brake pedal 41 is operated, the vehicle 10 is turning, and the magnitude |Gy| of the lateral acceleration of the vehicle 10 is less than the predetermined lateral acceleration threshold Gyth in such a state, the third apparatus performs the torque transmission interruption control when the magnitude |Gx| of the longitudinal acceleration of the vehicle 10 is equal to or greater than a predetermined longitudinal acceleration threshold Gxth. Accordingly, this difference will be mainly described below.

As described above, when the driver suddenly releases the accelerator pedal while the vehicle 10 is turning, spontaneous inward turning may occur. Accordingly, in the case where the operation of the accelerator pedal 81a is stopped while the yaw moment control by driving force is being performed, and the spontaneous inward turning occurs, the steering state of the vehicle 10 is apt to become the oversteer state.

Incidentally, in the case where spontaneous inward turning occurs, since engine braking acts on the front wheels, a deceleration (negative longitudinal acceleration Gx) is generated in the vehicle 10. The greater the deceleration, the larger the vertical loads of the front wheels and the greater the possibility of occurrence of spontaneous inward turning. In view of the above, the third apparatus is configured to determine, while the vehicle 10 is turning, whether the magnitude |Gx| of the longitudinal acceleration is equal to or greater than the predetermined longitudinal acceleration threshold Gxth, and performs the torque transmission interruption control when the magnitude |Gx| of the longitudinal acceleration is equal to or greater than the predetermined longitudinal acceleration threshold Gxth.

(Specific Operation)
<Coupling Control>

Figure 10:
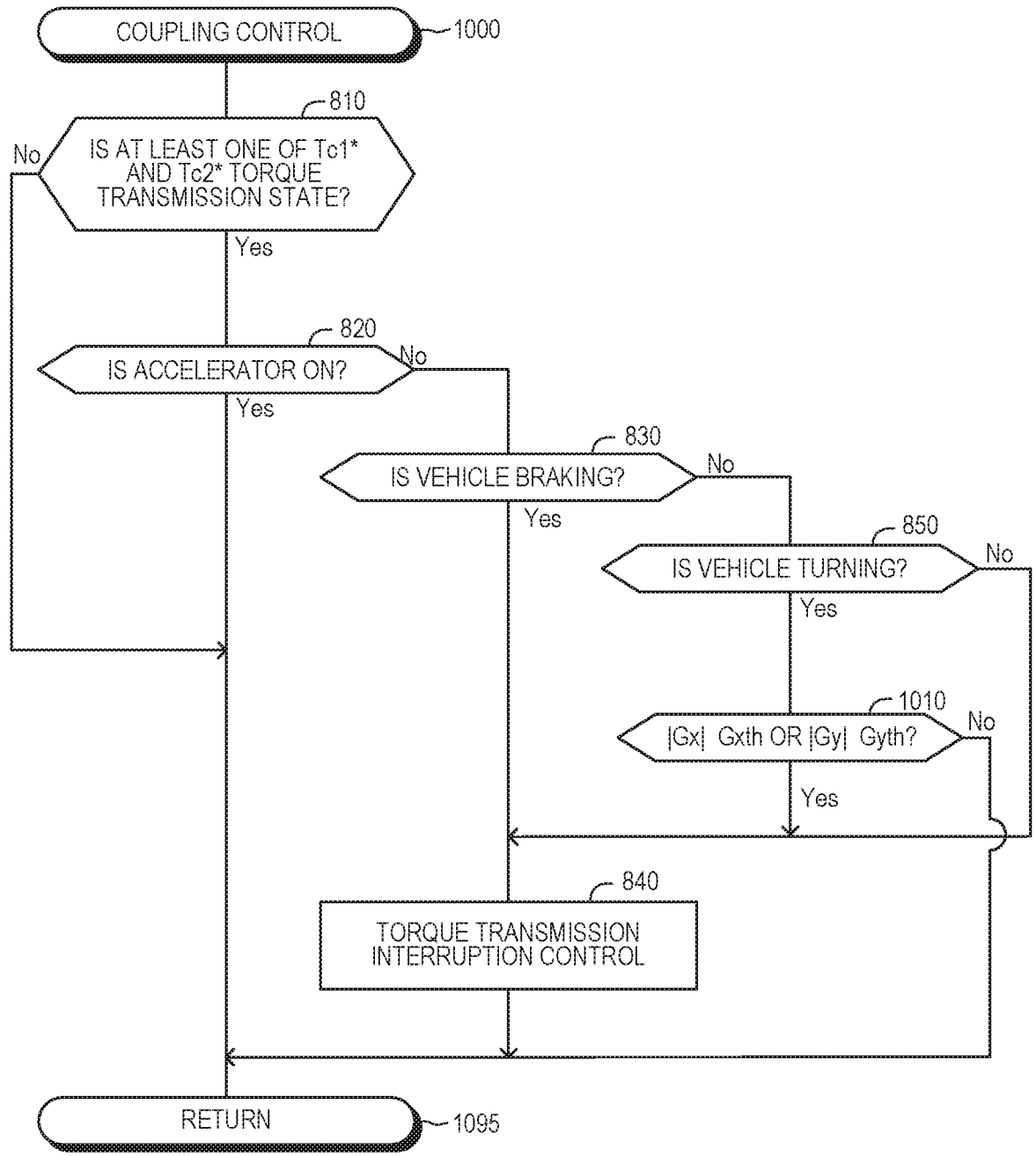
FIG. 10 is a flowchart for illustrating "coupling control routine" executed by the CPU of a 4WD ECU of a travel control apparatus according to a third embodiment of the present disclosure.

Actual operation of the third apparatus will now be described with reference to FIG. 10. The CPU of a 4WD ECU 60B of the third apparatus executes a coupling control routine illustrated by a flowchart in FIG. 10 every time a constant time elapses. In FIG. 10, it should be noted that steps identical with the steps shown in FIG. 8 are denoted by the same step numbers. Further, the actual operation will be described under the assumption that one of the first engagement state and the second engagement state has been set to the torque transmission state.

In the case where accelerator operation is not performed, braking is not performed, and the vehicle 10 is turning, the CPU starts the routine from Step 1000 at a predetermined timing and proceeds to Step 810. At Step 810 through Step 860, the CPU performs the same processings as those of Step 810 through Step 860 shown in FIG. 8. Therefore, the processings of Step 810 through Step 860 will not be described redundantly.

In accordance with the above-mentioned assumption, the CPU makes a "Yes" determination at Step 810 and proceeds to Step 820, and the CPU makes a "No" determination at Step 820 and proceeds to Step 830. Subsequently, the CPU makes a "No" determination at Step 830 and proceeds to Step 850. The CPU makes a "Yes" determination at Step 850 and proceeds to Step 1010 so as to determine whether the magnitude |Gx| of the longitudinal acceleration is equal to or greater than the predetermined longitudinal acceleration threshold Gxth or the magnitude |Gy| of the lateral acceleration is equal to or greater than the predetermined lateral acceleration threshold Gyth.

In the case where the magnitude |Gx| of the longitudinal acceleration is equal to or greater than the predetermined longitudinal acceleration threshold Gxth or the magnitude |Gy| of the lateral acceleration is equal to or greater than the predetermined lateral acceleration threshold Gyth, the CPU makes a "Yes" determination at Step 1010 and proceeds to Step 840 so as to perform the torque transmission interruption control. Meanwhile, in the case where the magnitude |Gx| of the longitudinal acceleration is less than the predetermined longitudinal acceleration threshold Gxth and the magnitude |Gy| of the lateral acceleration is less than the predetermined lateral acceleration threshold Gyth, the CPU makes a "No" determination at Step 1010 and proceeds directly to Step 1095.

Namely, even in the case where the vehicle 10 is turning and the magnitude |Gy| of the lateral acceleration is relatively small, when the magnitude |Gx| of the longitudinal acceleration is equal to or greater than the predetermined longitudinal acceleration threshold Gxth, the third apparatus immediately performs the torque transmission interruption control, thereby avoiding the occurrence of oversteer behavior of the vehicle 10.

As described above, in the case where at least one of the first engagement state and the second engagement state has been set to the torque transmission state and the operation of the accelerator pedal 81a is performed, the third apparatus is configured to determine whether at least one of the following three conditions is satisfied.

Condition 1 b: the accelerator pedal 81a is not operated and the brake pedal 41 is not operated; and in such a state, the vehicle 10 is turning, and the magnitude |Gy| of the lateral acceleration of the vehicle 10 is equal to or greater than the predetermined lateral acceleration threshold Gyth or the magnitude |Gx| of the longitudinal acceleration is equal to or greater than the predetermined longitudinal acceleration threshold Gxth.

Condition 2: the accelerator pedal 81a is not operated and the brake pedal 41 is being operated.

Condition 3: the accelerator pedal 81a is not operated and the brake pedal 41 is not operated; and the vehicle 10 is not turning in such a state.

Further, the third apparatus is configured to set the first engagement state and the second engagement state to the torque transmission interruption state when any of Condition 1b through Condition 3 is satisfied.

Accordingly, even in the case where the vehicle 10 is turning and the magnitude |Gy| of the lateral acceleration is relatively small, the third apparatus stops the yaw moment control by driving force when the magnitude |Gx| of the longitudinal acceleration is relatively large. Thus, the frequency of occurrence of spontaneous inward turning due to stoppage of operation of the accelerator pedal 81a is reduced, and, as a result, it is possible to prevent the steering state of the vehicle 10 from becoming the oversteer state. Further, the third apparatus also stops the yaw moment control by driving force when the brake pedal is operated and a relatively large deceleration generates in the vehicle. Accordingly, the frequency of occurrence of understeer behavior of the primary drive wheels (front wheels) can be reduced.

MODIFICATIONS

The present disclosure is not limited to the above-mentioned embodiments, and various modifications can be adopted within the scope of the present disclosure.

In the above-mentioned embodiments, the speed increasing ratio RZ is set to 1.02. However, the speed increasing ratio RZ may be set to an arbitrary value greater than 1.

Figure 8:
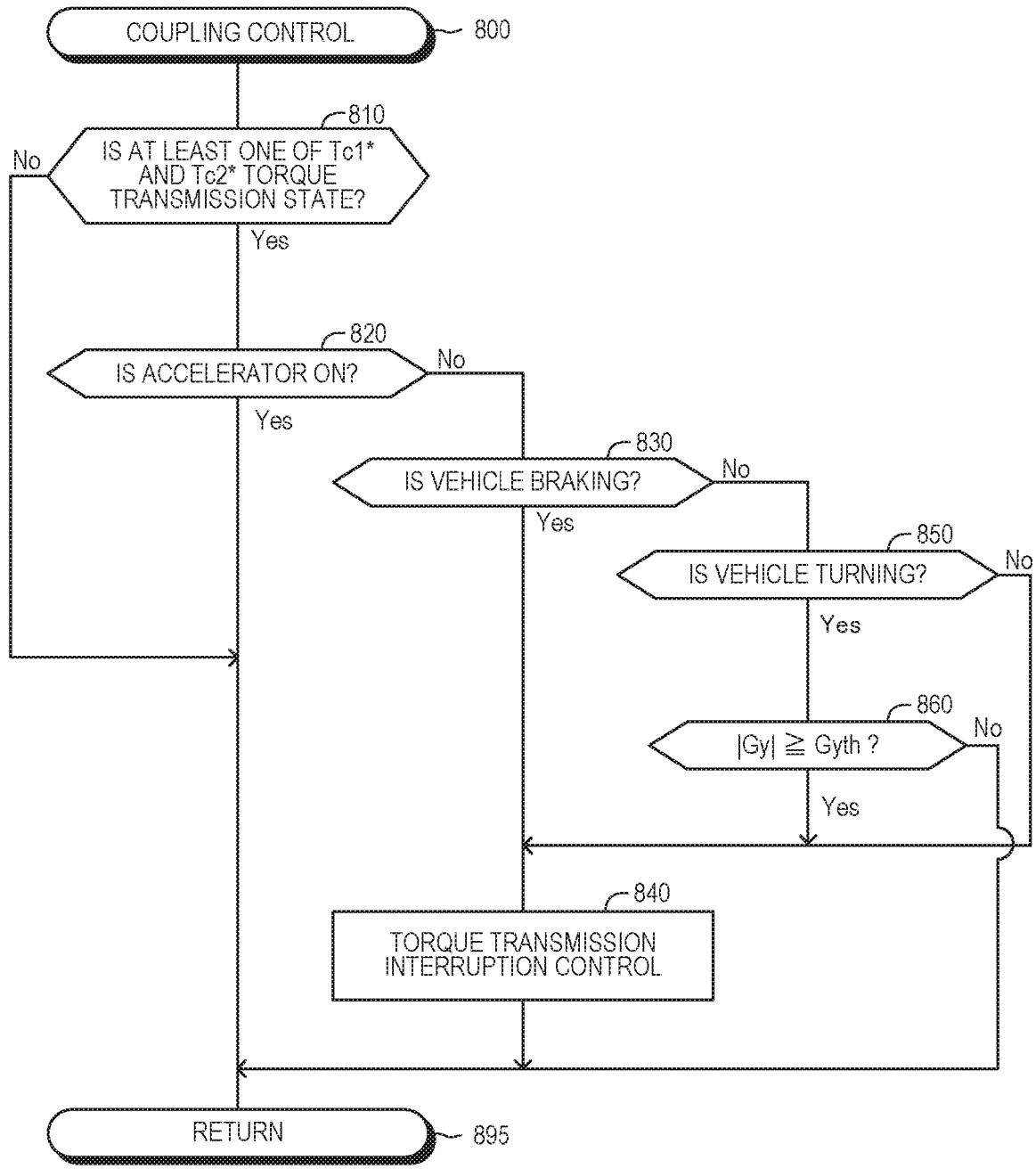
FIG. 8 is a flowchart for illustrating "coupling control routine" executed by the CPU of a 4WD ECU illustrated in FIG. 1.
Figure 9:
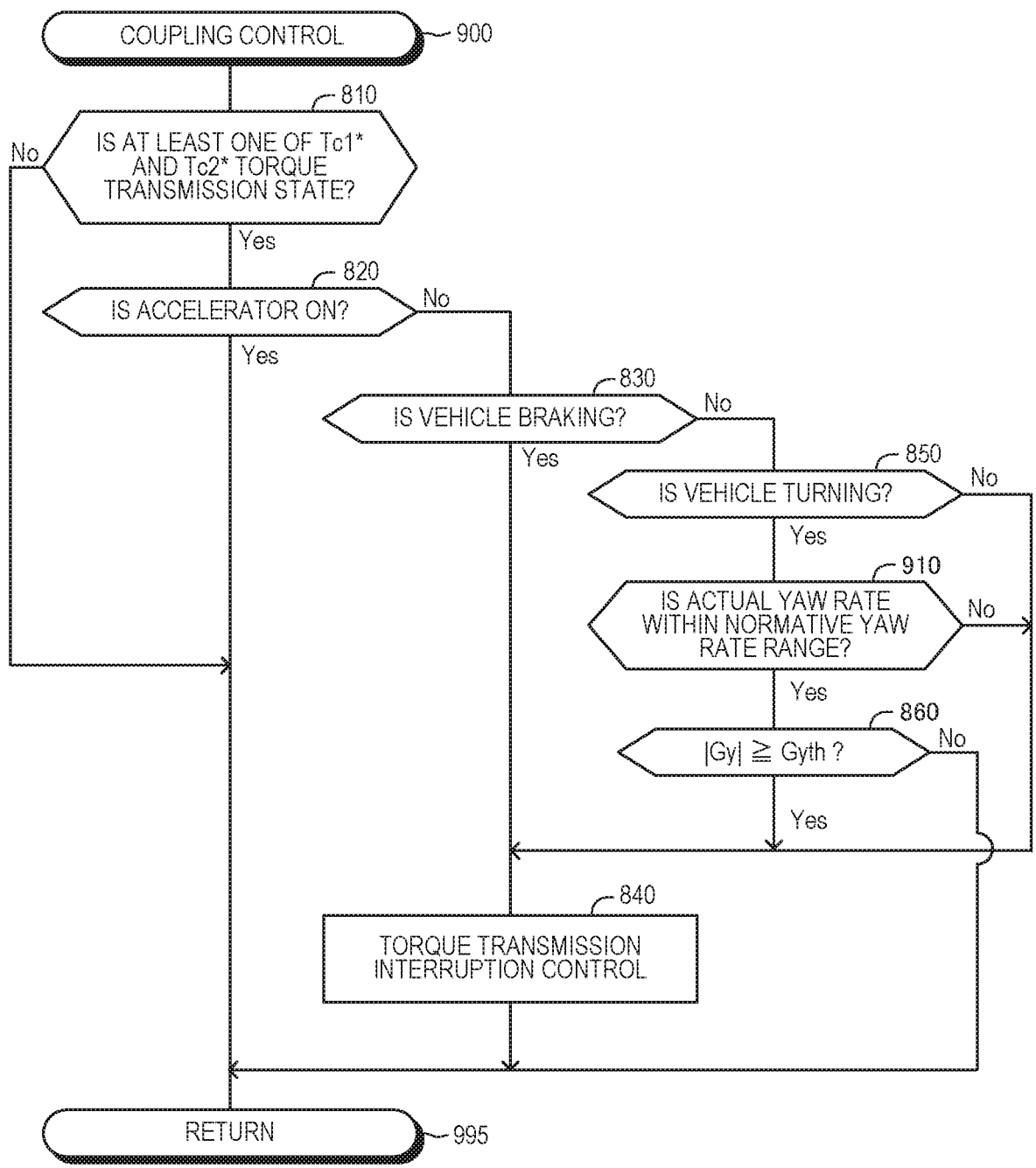
FIG. 9 is a flowchart for illustrating "coupling control routine" executed by the CPU of a 4WD ECU of a travel control apparatus according to a second embodiment of the present disclosure.

In the above-mentioned embodiments, the CPU of the 4WD ECU 60 (60A, 60B) executes the routine shown in FIG. 8, 9, or 10. However, the above-mentioned routine may be executed by the CPU of the brake ECU 70 in place of the CPU of the 4WD ECU 60, or may be executed by the CPU of a single ECU into which the 4WD ECU 60, the brake ECU 70, etc. are integrated.

In the above-mentioned embodiments, the vehicle 10 includes the drive ECU 50, the 4WD ECU 60, and the brake ECU 70. However, two or more of these ECUs may be integrated into a single ECU.

In the above-mentioned embodiments, the clutch apparatus (coupling apparatus) 36 is a clutch apparatus in which a multi-disc clutch and an electromagnetic clutch are combined. However, only a multi-disc clutch or an electromagnetic clutch may be used. Also, a planetary gear may be used in the clutch apparatus.

In the above-mentioned embodiments, the yaw rate sensor 85, the lateral acceleration sensor 86, and the longitudinal acceleration sensor 87 are individually provided in the vehicle 10. However, the yaw rate sensor 85, the lateral acceleration sensor 86, the longitudinal acceleration sensor 87 may be replaced with a motion state quantity sensor into which these sensors are integrated.

In the above-mentioned embodiments, the first clutch 361 is provided between the rear differential case 353 and the rear left wheel axle 38L, and the second clutch 362 is provided between the rear differential case 353 and the rear right wheel axle 38R. Namely, in the above-mentioned embodiments, the vehicle 10 is configured such that the front wheels serve as the primary drive wheels, and the rear wheels serve as the secondary drive wheels. However, a travel control apparatus of a modified embodiment may be applied to a vehicle in which clutches corresponding to the first clutch 361 and the second clutch 362 are provided for the front wheels. Namely, the travel control apparatus of the modified embodiment may be applied to a vehicle configured such that the front wheels serve as the secondary drive wheels, and the rear wheels serve as the primary drive wheels.

According to this aspect, when the yaw moment control by driving force is performed, at the time of rightward turning, the engagement state of the clutch corresponding to the front left wheel WFL is set to the torque transmission state, and the engagement state of the clutch corresponding to the front right wheel WFR is set to the torque transmission interruption state. Meanwhile, at the time of leftward turning, the engagement state of the clutch corresponding to the front right wheel WFR is set to the torque transmission state, and the engagement state of the clutch corresponding to the front left wheel WFL is set to the torque transmission interruption state. When the yaw moment control by driving force is not performed, both the engagement state of the clutch corresponding to the front left wheel WFL and the engagement state of the clutch corresponding to the front right wheel WFR are set to the torque transmission interruption state.

In this aspect, when, for example, one of the first through third conditions described for the first apparatus is satisfied, both the engagement state of the clutch corresponding to the front left wheel WFL and the engagement state of the clutch corresponding to the front right wheel WFR are set to the torque transmission interruption state. As a result, the degree to which the lateral force margins of the rear wheels decrease (the frequency of occurrence of understeer behavior) can be reduced.

In the above-mentioned embodiments, the drive apparatus 20 is a combination of an internal combustion engine and a transmission apparatus. However, the drive apparatus 20 may be a combination of an electric motor and a transmission apparatus, or a drive apparatus for a hybrid system in which an internal combustion engine, an electric motor, and a transmission apparatus are combined.

In the above-mentioned second embodiment, the normative yaw rate Ym of the vehicle 10 is calculated in accordance with the above-mentioned Expression (5). However, the normative yaw rate Ym of the vehicle 10 may be calculated in accordance with the following Expression (8). According to Expression (8), the normative yaw rate is calculated on the basis of the steering angle St, the body speed Vb, the lateral acceleration Gy, etc.

$$Yrn = (Vb \cdot St)/(N \cdot L) - Kh \cdot Gy \cdot Vb \qquad (8)$$

What is claimed is:

1. A travel control apparatus for a four-wheel drive vehicle which includes:
   a drive apparatus for generating driving force;
   a differential apparatus which transmits the driving force to a left primary drive wheel axle connected to a left primary drive wheel and a right primary drive wheel axle connected to a right primary drive wheel while allowing a differential between the left primary drive wheel axle and the right primary drive wheel axle;
   a transfer gear apparatus for transmitting the driving force to a secondary drive wheel side;
   a final gear apparatus which transmits the driving force from the transfer gear apparatus to a left secondary drive wheel axle connected to a left secondary drive wheel and a right secondary drive wheel axle connected to a right secondary drive wheel;
   a first coupling apparatus which is interposed between a drive output part of the final gear apparatus and the left secondary drive wheel axle and which can change a first engagement state which is a state of engagement between the drive output part and the left secondary drive wheel axle between a torque transmission state in which torque is transmitted between the drive output part and the left secondary drive wheel axle and a torque transmission interruption state in which no torque is transmitted between the drive output part and the left secondary drive wheel axle; and a second coupling apparatus which is interposed between the drive output part and the right secondary drive wheel axle and which can change a second engagement state which is the state of engagement between the drive output part and the right secondary drive wheel axle between a torque transmission state in which torque is transmitted between the drive output part and the right secondary drive wheel axle and a torque transmission interruption state in which no torque is transmitted between the drive output part and the right secondary drive wheel axle, a ratio of rotational speed of the drive output part to an average of rotational speed of the left primary drive wheel axle and rotational speed of the right primary drive wheel axle being set to a predetermined ratio greater than 1, the travel control apparatus comprising:

a lateral acceleration sensor for detecting lateral acceleration of the four-wheel drive vehicle;

a controller which can independently set each of the first engagement state and the second engagement state to the torque transmission state or the torque transmission interruption state, wherein the controller is configured such that, in the case where one of the first engagement state and the second engagement state which corresponds to a secondary drive wheel on the outer side of a turning locus has been set to the torque transmission state and the other of the first engagement state and the second engagement state which corresponds to a secondary drive wheel on the inner side of the turning locus has been set to the torque transmission interruption state, the controller determines, when an accelerator pedal is not operated, whether the magnitude of the detected lateral acceleration is equal to or greater than a predetermined lateral acceleration threshold, and changes the engagement state having been set to the torque transmission state to the torque transmission interruption state upon determination that the magnitude of the detected lateral acceleration is equal to or greater than the predetermined lateral acceleration threshold.

2. A travel control apparatus for a four-wheel drive vehicle according to claim 1, wherein the controller is configured to determine, when the accelerator pedal is not operated, whether a brake pedal is operated, and change the engagement state having been set to the torque transmission state to the torque transmission interruption state upon determination that the brake pedal is operated, irrespective of the magnitude of the lateral acceleration.

3. A travel control apparatus for a four-wheel drive vehicle according to claim 1, wherein the four-wheel drive vehicle further includes a yaw rate sensor for detecting yaw rate of the four-wheel drive vehicle; and the controller is configured to determine, when the accelerator pedal is not operated, whether the detected yaw rate has deviated from a normative yaw rate determined in accordance with a travel state of the four-wheel drive vehicle, and change the engagement state having been set to the torque transmission state to the torque transmission interruption state upon determination that the detected yaw rate has deviated from the normative yaw rate, irrespective of the magnitude of the lateral acceleration.

4. A travel control apparatus for a four-wheel drive vehicle according to claim 2, wherein the four-wheel drive vehicle further includes a yaw rate sensor for detecting yaw rate of the four-wheel drive vehicle; and the controller is configured to determine, when the accelerator pedal is not operated, whether the detected yaw rate has deviated from a normative yaw rate determined in accordance with a travel state of the four-wheel drive vehicle, and change the engagement state having been set to the torque transmission state to the torque transmission interruption state upon determination that the detected yaw rate has deviated from the normative yaw rate, irrespective of the magnitude of the lateral acceleration.

5. A travel control apparatus for a four-wheel drive vehicle according to claim 1, wherein the four-wheel drive vehicle further includes a longitudinal acceleration sensor for detecting longitudinal acceleration of the four-wheel drive vehicle; and the controller is configured to determine, when the accelerator pedal is not operated, whether the magnitude of the detected longitudinal acceleration is equal to or greater than a predetermined longitudinal acceleration threshold, and change the engagement state having been set to the torque transmission state to the torque transmission interruption state upon determination that the magnitude of the detected longitudinal acceleration is equal to or greater than the predetermined longitudinal acceleration threshold, even when the magnitude of the lateral acceleration is determined to be less than the predetermined lateral acceleration threshold.

6. A travel control apparatus for a four-wheel drive vehicle according to claim 2, wherein the four-wheel drive vehicle further includes a longitudinal acceleration sensor for detecting longitudinal acceleration of the four-wheel drive vehicle; and the controller is configured to determine, when the accelerator pedal is not operated, whether the magnitude of the detected longitudinal acceleration is equal to or greater than a predetermined longitudinal acceleration threshold, and change the engagement state having been set to the torque transmission state to the torque transmission interruption state upon determination that the magnitude of the detected longitudinal acceleration is equal to or greater than the predetermined longitudinal acceleration threshold, even when the magnitude of the lateral acceleration is determined to be less than the predetermined lateral acceleration threshold.

7. A travel control apparatus for a four-wheel drive vehicle according to claim 3, wherein the four-wheel drive vehicle further includes a longitudinal acceleration sensor for detecting longitudinal acceleration of the four-wheel drive vehicle; and the controller is configured to determine, when the accelerator pedal is not operated, whether the magnitude of the detected longitudinal acceleration is equal to or greater than a predetermined longitudinal acceleration threshold, and change the engagement state having been set to the torque transmission state to the torque transmission interruption state upon determination that the magnitude of the detected longitudinal acceleration is equal to or greater than the predetermined longitudinal acceleration threshold, even when the magnitude of the lateral acceleration is determined to be less than the predetermined lateral acceleration threshold.

8. A travel control apparatus for a four-wheel drive vehicle according to claim 4, wherein the four-wheel drive vehicle further includes a longitudinal acceleration sensor for detecting longitudinal acceleration of the four-wheel drive vehicle; and the controller is configured to determine, when the accelerator pedal is not operated, whether the magnitude of the detected longitudinal acceleration is equal to or greater than a predetermined longitudinal acceleration threshold, and change the engagement state having been set to the torque transmission state to the torque transmission interruption state upon determination that the magnitude of the detected longitudinal acceleration is equal to or greater than the predetermined longitudinal acceleration threshold, even when the magnitude of the lateral acceleration is determined to be less than the predetermined lateral acceleration threshold.

* * * * *